US010972639B2

(12) United States Patent
Mandai et al.

(10) Patent No.: US 10,972,639 B2
(45) Date of Patent: Apr. 6, 2021

(54) IN-VEHICLE DEVICE

(71) Applicant: Clarion Co., Ltd., Saitama (JP)

(72) Inventors: Kohei Mandai, Tokyo (JP); Daisuke Fukuda, Saitama (JP); Shuzo Kaneko, Saitama (JP); Hiroaki Andou, Hitachi (JP)

(73) Assignee: CLARION CO., LTD., Saitama (JP)

( * ) Notice: Subject to any disclaimer, the term of this patent is extended or adjusted under 35 U.S.C. 154(b) by 106 days.

(21) Appl. No.: 16/324,316

(22) PCT Filed: May 10, 2017

(86) PCT No.: PCT/JP2017/017746
§ 371 (c)(1),
(2) Date: Feb. 8, 2019

(87) PCT Pub. No.: WO2018/029925
PCT Pub. Date: Feb. 15, 2018

(65) Prior Publication Data
US 2019/0174029 A1    Jun. 6, 2019

(30) Foreign Application Priority Data
Aug. 9, 2016  (JP) .............................. JP2016-156627

(51) Int. Cl.
*H04N 5/217*  (2011.01)
*B60R 1/00*  (2006.01)
(Continued)

(52) U.S. Cl.
CPC ............. *H04N 5/2171* (2013.01); *B60R 1/00* (2013.01); *G02B 27/0006* (2013.01); *G06T 7/00* (2013.01);
(Continued)

(58) Field of Classification Search
CPC ...... H04N 5/2171; H04N 5/225; H04N 5/232; G06T 7/11; G06T 7/00; B60R 1/00; B60R 2300/30; G02B 27/0006
See application file for complete search history.

(56) References Cited

U.S. PATENT DOCUMENTS

2007/0171294 A1   7/2007  Watanabe
2015/0172582 A1*  6/2015  Kiyohara ............. H04N 5/2171
                                                            348/322
(Continued)

FOREIGN PATENT DOCUMENTS

JP    2007-201637 A    8/2007
JP    2012-038048 A    2/2012
(Continued)

OTHER PUBLICATIONS

Extended European Search Report issued in corresponding European Patent Application No. 17839000.1 dated Jan. 30, 2020.
(Continued)

*Primary Examiner* — Twyler L Haskins
*Assistant Examiner* — Fayez A Bhuiyan
(74) *Attorney, Agent, or Firm* — Foley & Lardner LLP

(57) ABSTRACT

An in-vehicle device 4 includes an image acquisition unit 42 that acquires an image photographed by a camera 2 including a lens, a storage unit 7, a dirt detection unit 6 that detects dirt on the lens on the basis of the image acquired by the image acquisition unit 42 and that stores dirt region information indicating a region where the dirt exists in the image into the storage unit 7, a dirt removal information generation unit 8 that generates dirt removal information indicating a region where the dirt on the lens is removed, and a rewriting unit 12 that rewrites the dirt region information on the basis
(Continued)

of the dirt removal information. Accordingly, it is possible to rewrite the dirt region information on the basis of the dirt removal information.

14 Claims, 15 Drawing Sheets

(51) Int. Cl.
*H04N 5/232* (2006.01)
*H04N 5/225* (2006.01)
*G06T 7/00* (2017.01)
*G06T 7/11* (2017.01)
*G02B 27/00* (2006.01)

(52) U.S. Cl.
CPC ............... *G06T 7/11* (2017.01); *H04N 5/225* (2013.01); *H04N 5/232* (2013.01); *B60R 2300/30* (2013.01)

(56) References Cited

U.S. PATENT DOCUMENTS

| | | |
|---|---|---|
| 2015/0281571 A1 | 10/2015 | Hitomi et al. |
| 2015/0329083 A1 | 11/2015 | Kiyohara et al. |
| 2017/0109590 A1 | 4/2017 | Gehrke |

FOREIGN PATENT DOCUMENTS

| | | |
|---|---|---|
| WO | WO-2014/007153 A1 | 1/2014 |
| WO | WO-2014/007294 A1 | 1/2014 |
| WO | WO-2015/183889 A1 | 12/2015 |

OTHER PUBLICATIONS

International Search Report with English translation and Written Opinion issued in corresponding application No. PCT/JP2017/017746 dated Jul. 25, 2017.

\* cited by examiner

FIG. 4

| PROCESSING NAME | STATE | STATE SWITCHING CONDITION |
|---|---|---|
| WATER DROP DETECTION | STOPPED | VEHICLE SPEED EXCEED 2 km/h |
| WATER DROP DETECTION | OPERATED | VEHICLE SPEED BECOME LOWER THAN 1 km/h |
| MUD DETECTION | STOPPED | VEHICLE SPEED EXCEED 2 km/h FOR THREE SECOND DURING DAY |
| MUD DETECTION | OPERATED | IT BECOME NIGHT |
| MUD DETECTION | STOPPED | VEHICLE SPEED BECOME LOWER THAN 15 km/h FOR ONE SECOND |
| ... | ... | ... |

FIG. 11

| PERIOD OF TIME | VEHICLE SPEED | PROCESSING NAME | ELIMINATION REGION REFLECTED OBJECT |
|---|---|---|---|
| DAY | 0 TO 25 km/h | WATER DROP DETECTION | MUD DETECTION |
| | | MUD DETECTION | WATER DROP DETECTION |
| | | PEDESTRIAN DETECTION | WATER DROP DETECTION MUD DETECTION |
| | | VEHICLE DETECTION | WATER DROP DETECTION MUD DETECTION |
| | | ... | ... |
| | 25 TO 60 km/h | ... | ... |
| | ... | ... | ... |
| NIGHT | ... | ... | ... |
| ... | ... | ... | ... |

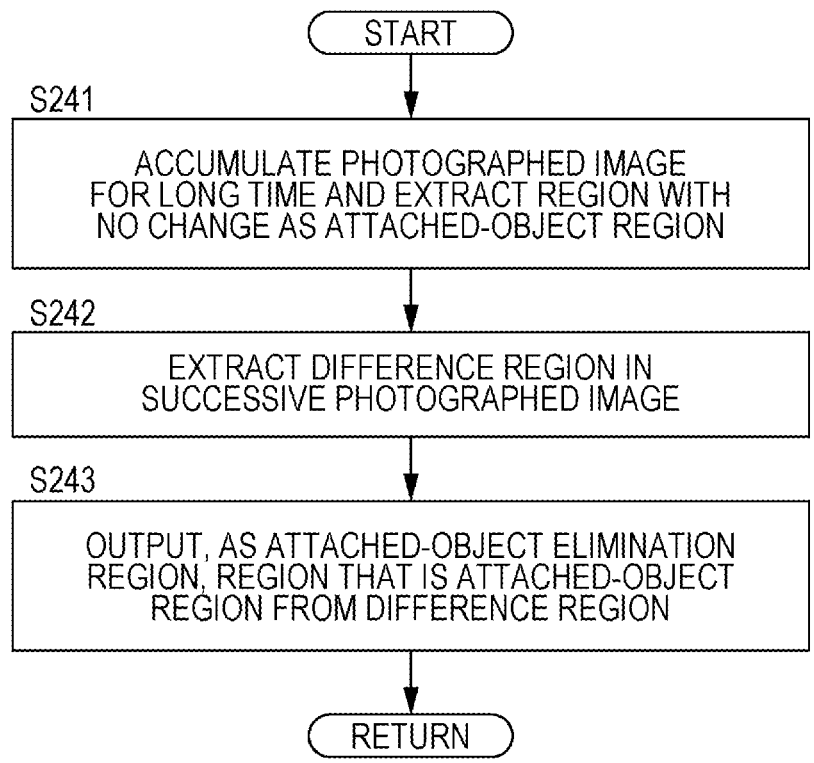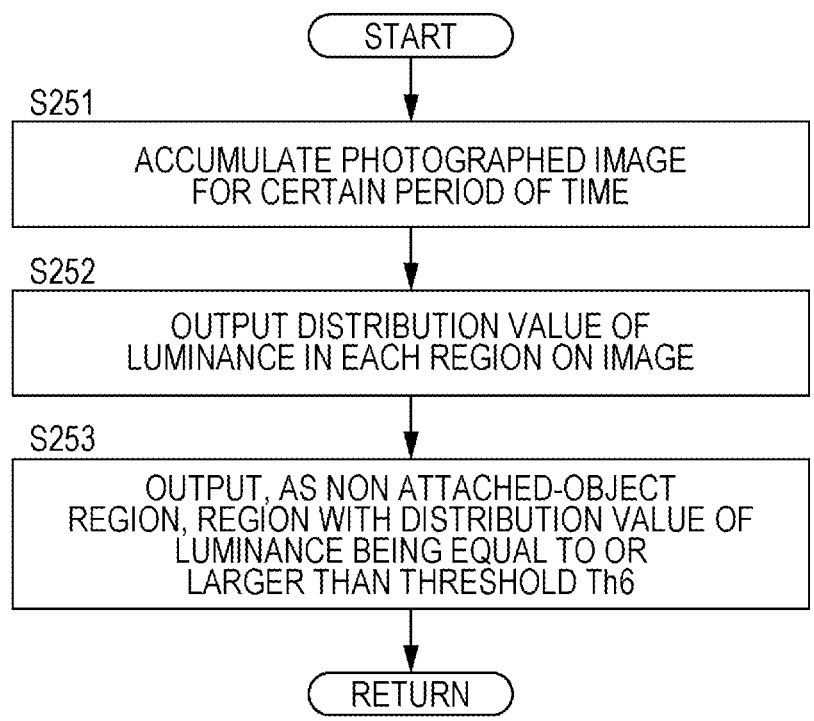

FIG. 18
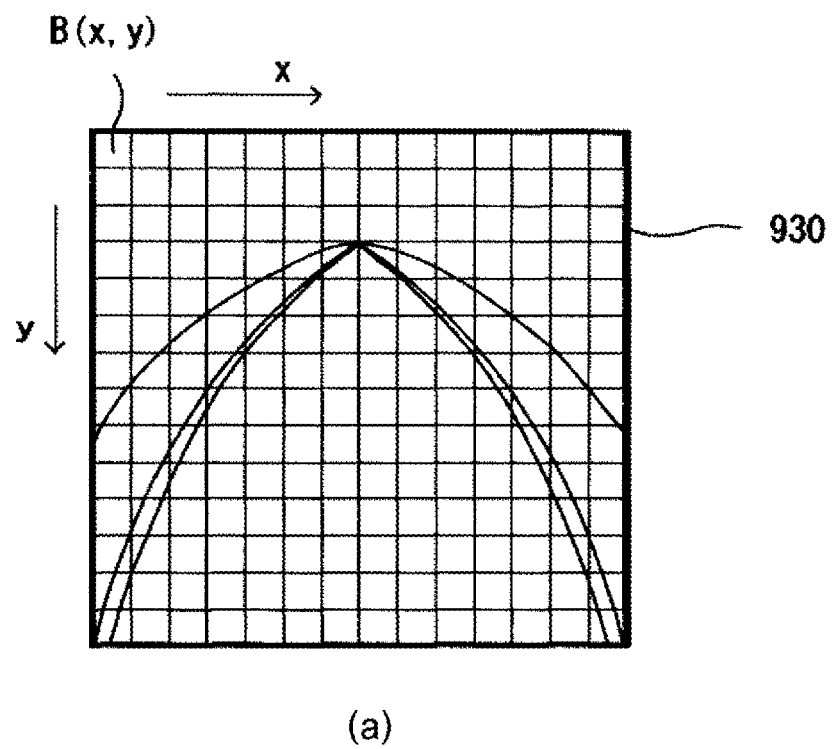
(a)
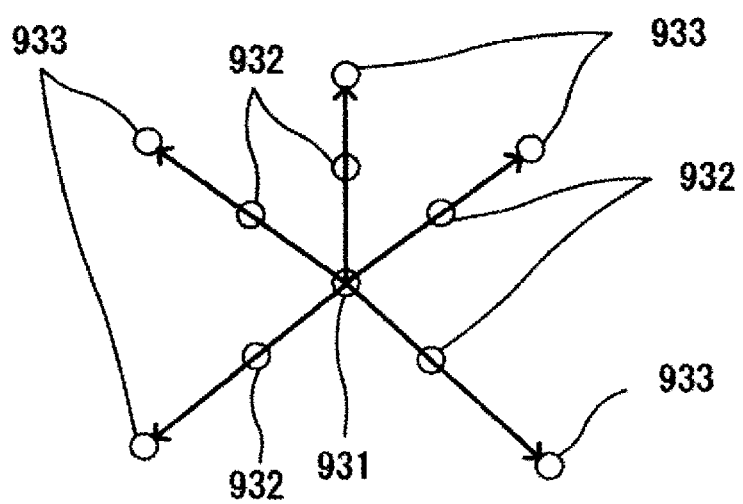
(b)

IN-VEHICLE DEVICE

TECHNICAL FIELD

The present invention relates to an in-vehicle device.

BACKGROUND ART

A technology of mounting a camera in a vehicle, performing image recognition processing or the like on an image acquired from the camera, and using this for a support for driving a vehicle has been known. When a foreign object such as a water drop or mud is attached to a lens of a camera, there is a bad influence on the image recognition processing. A device to detect an object attached to a lens is disclosed, for example, in PTL 1.

CITATION LIST

Patent Literature

PTL 1: JP2012-38048 A

SUMMARY OF INVENTION

Technical Problem

In the invention disclosed in PTL 1, it is not possible to detect removal of dirt in a case where dirt detection cannot be performed.

Solution to Problem

An in-vehicle device according to a first aspect of the present invention includes an image acquisition unit that acquires an image photographed by a camera including a lens, a storage unit, a dirt detection unit that detects dirt on the lens on the basis of the image acquired by the image acquisition unit and that stores dirt region information indicating a region where the dirt exists in the image into the storage unit, a dirt removal information generation unit that generates dirt removal information indicating a region where the dirt on the lens is removed, and a rewriting unit that rewrites the dirt region information on the basis of the dirt removal information.

Advantageous Effects of Invention

According to the present invention, by rewriting dirt region information on the basis of dirt removal information indicating a region where dirt is removed, it is possible to accurately recognize a region of dirt even in a case where dirt detection cannot be performed.

BRIEF DESCRIPTION OF DRAWINGS

FIG. 4 is a view illustrating an example of a state switching condition table.
FIG. 11 is a view illustrating an example of an elimination relation table.
FIG. 13 is a flowchart illustrating an operation of an attached-object elimination detection unit.
FIG. 14 is a flowchart illustrating an operation of an attached-object elimination detection unit in a first modification example of the third embodiment.
FIG. 18 is a view for describing water drop detection.

DESCRIPTION OF EMBODIMENTS

First Embodiment

Figure 1:
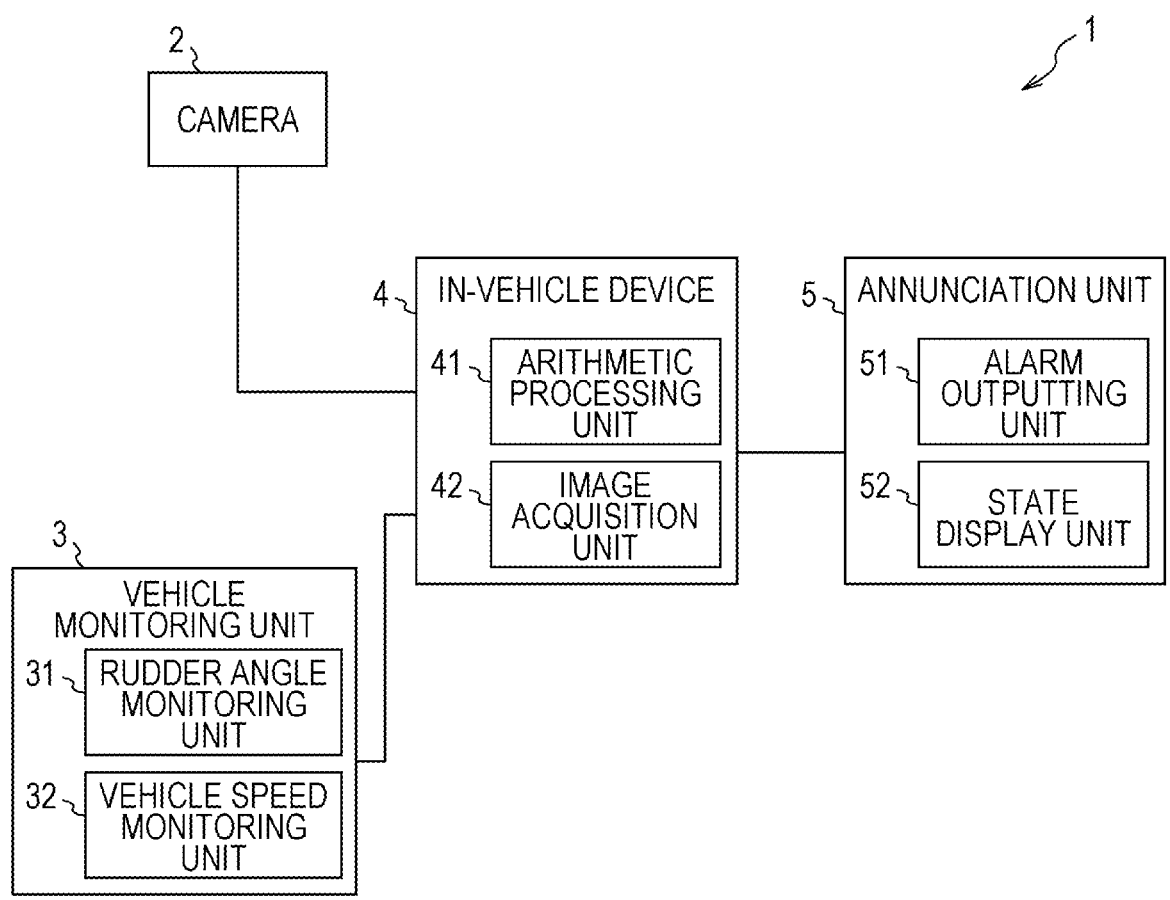
FIG. 1 is a hardware configuration view of a vehicle in a first embodiment.

In the following, a first embodiment of an in-vehicle device according to the present invention will be described with reference to FIG. 1 to FIG. 8.
(Hardware Configuration)
FIG. 1 is a hardware configuration view of a vehicle 1. The vehicle 1 includes a camera 2, a vehicle monitoring unit 3, an in-vehicle device 4, and an annunciation unit 5.

The camera 2 is provided outwardly in the vehicle 1 and a photographing region thereof includes a road surface around the vehicle 1. The camera 2 performs photographing at predetermined time intervals and outputs an image acquired by the photographing (photographed image, in the following) to the in-vehicle device 4. The camera 2 includes a lens. When the lens becomes dirty due to mud or a water drop, a region corresponding to the dirt in a photographed image is influenced.

The vehicle monitoring unit 3 acquires information related to a traveling state of the vehicle 1. The vehicle monitoring unit 3 includes a rudder angle monitoring unit 31 and a vehicle speed monitoring unit 32. The rudder angle monitoring unit 31 is, for example, an angle sensor and acquires rudder angle information of the vehicle 1. The vehicle speed monitoring unit 32 is, for example, a rotary encoder and acquires a traveling speed, that is, a vehicle speed of the vehicle 1. The vehicle monitoring unit 3 outputs vehicle information such as an acquired rudder angle or vehicle speed to the in-vehicle device 4.

The in-vehicle device 4 includes an arithmetic processing unit 41 and an image acquisition unit 42. The arithmetic processing unit 41 includes a CPU, a RAM, and a ROM. The CPU performs processing (described later) by deploying and executing, in the RAM, a program stored in the ROM. The image acquisition unit 42 acquires a photographed image from the camera 2 and performs an output thereof to the arithmetic processing unit 41. The arithmetic processing unit 41 stores the input photographed image in the RAM and performs predetermined image processing on the stored photographed image. For example, processing such as pedestrian detection of detecting a shape of a person from a photographed image, vehicle detection of detecting a vehicle therefrom, or attached-object detection of detecting an attached object on the lens which object appears on a photographed image is performed. An output of these kinds of image processing is arbitrarily stored in the RAM. Then, the arithmetic processing unit 41 controls the annunciation unit 5 on the basis of the output of these kinds of image processing.

The annunciation unit 5 makes annunciation to a passenger of a vehicle. The annunciation unit 5 includes an alarm outputting unit 51 and a state display unit 52. The alarm outputting unit 51 is a device that gives an alarm to a passenger of a vehicle by using at least one of sound and light and is, for example, an alarm lamp or an alarm buzzer. An operation of the alarm outputting unit 51 is controlled by the arithmetic processing unit 41 of the in-vehicle device 4. For example, in a case where the arithmetic processing unit 41 detects an attached object on the lens of the camera 2 by attached-object detection processing, it is possible to give a warning to clean the lens of the camera 2 to a passenger of a vehicle by turning on the alarm buzzer. The state display unit 52 is a screen display device such as a display and outputs visual information to a passenger of a vehicle. An operation of the state display unit 52 is controlled by the arithmetic processing unit 41 of the in-vehicle device 4. For example, on the basis of an operation command from the CPU, the state display unit 52 synthesizes, on a photographed image from the camera 2, a position of a pedestrian on the photographed image which position is detected by pedestrian detection processing by the arithmetic processing unit 41, and performs a display thereof.

(Control Block)

Figure 2:
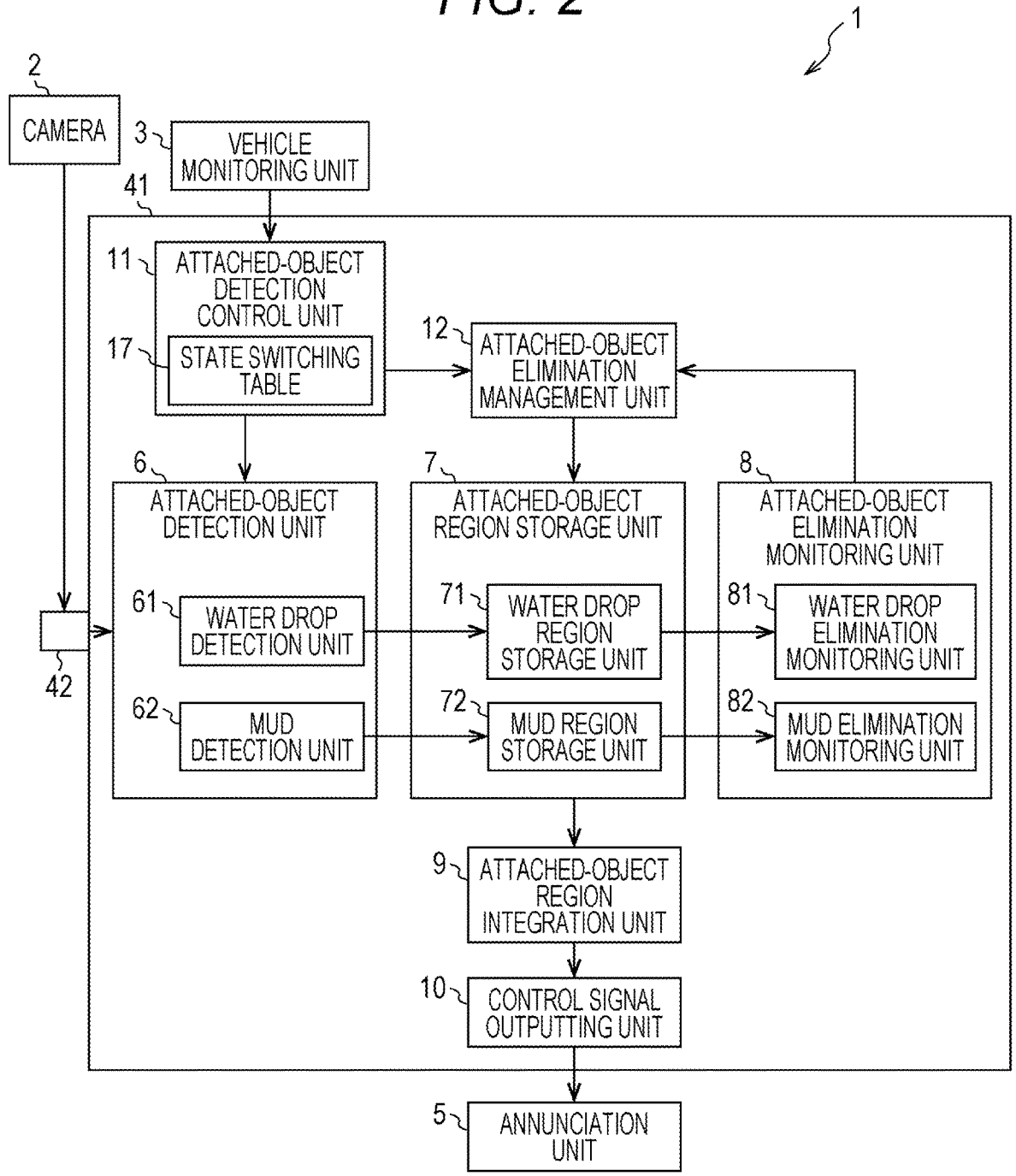
FIG. 2 is a control block diagram of an in-vehicle device in the first embodiment.

FIG. 2 is a control block diagram of the arithmetic processing unit 41 according to the first embodiment. When the CPU executes a program stored in the ROM, the arithmetic processing unit 41 functions as an attached-object detection unit 6, an attached-object region storage unit 7, an attached-object elimination monitoring unit 8, an attached-object region integration unit 9, a control signal outputting unit 10, an attached-object detection control unit 11, and an attached-object elimination management unit 12.

The attached-object detection unit 6 detects an attached object on the lens of the camera 2 by using a photographed image output from the camera 2. The attached-object detection unit 6 includes a water drop detection unit 61 that detects a water drop, and a mud detection unit 62 that detects mud. Each of the water drop detection unit 61 and the mud detection unit 62 is operated on the basis of an operation command from the attached-object detection control unit 11. In other words, each of the water drop detection unit 61 and the mud detection unit 62 is switched between an operated state and a stopped state on the basis of an operation command from the attached-object detection control unit 11.

The water drop detection unit 61 detects a water drop attached to the lens and outputs information indicating a region where the water drop is attached (water drop region, in the following) in a photographed image (water drop region information, in the following) to the attached-object region storage unit 7. A detailed operation of the water drop detection unit 61 will be described later.

The mud detection unit 62 detects mud attached to the lens and outputs information indicating a region where the mud is attached (mud region, in the following) in a photographed image (mud region information, in the following) to the attached-object region storage unit 7. In the following, the water drop region and the mud region are collectively called an "attached-object region." Also, the water drop region information and the mud region information are collectively called "attached-object region information" in the following. A detailed operation of the mud detection unit 62 will be described later.

The attached-object region storage unit 7 stores attached-object region information input from the attached-object detection unit 6. The attached-object region storage unit 7 includes a water drop region storage unit 71 corresponding to the water drop detection unit 61, and a mud region storage unit 72 corresponding to the mud detection unit 62. The water drop region storage unit 71 stores attached-object information input from the water drop detection unit 61, that is, water drop region information. The mud region storage unit 72 stores attached-object information input from the mud detection unit 62, that is, mud region information.

In a case where an operation of each of the water drop detection unit 61 and the mud detection unit 62 is stopped, attached-object region information is not input and attached-object information stored last is kept in each of the water drop region storage unit 71 and the mud region storage unit 72.

Figure 3:
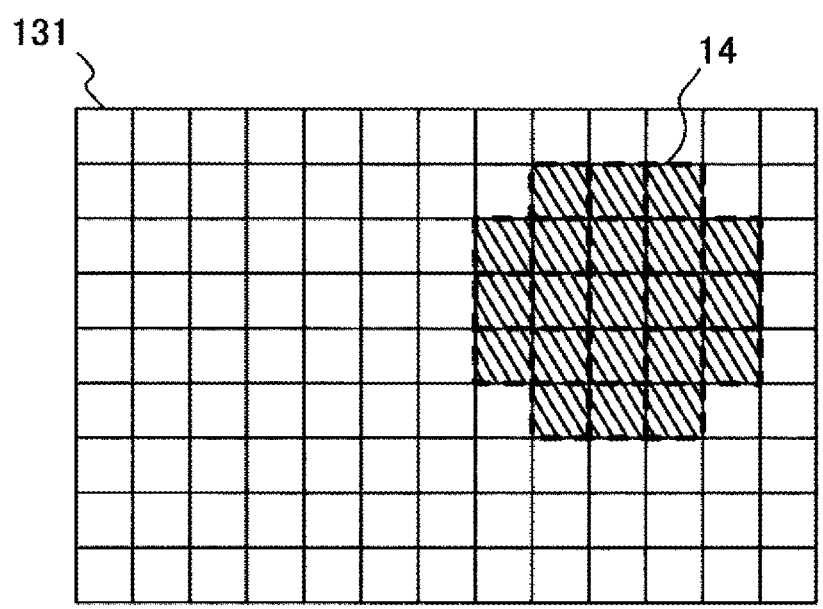
FIG. 3 is a view illustrating an example of attached-object region information.

FIG. 3 is a view illustrating an example of attached-object region information stored in the attached-object region storage unit 7. A region 14 where an attached object is detected is indicated on a detection surface 131 that is a photographed image divided in a grid manner. The region 14 where an attached object is detected is a region specified by attached-object region information.

The attached-object elimination monitoring unit 8 monitors attached-object region information stored in each storage unit of the attached-object region storage unit 7 and detects a region where an attached object on the lens of the camera 2 is removed. The attached-object elimination monitoring unit 8 outputs information indicating a region where removal of an attached object is detected (attached-object elimination region information, in the following) to the attached-object elimination management unit 12. The attached-object elimination monitoring unit 8 includes monitoring units respectively corresponding to the storage units of the attached-object region storage unit 7, that is, a water drop elimination monitoring unit 81 and a mud elimination monitoring unit 82. The water drop elimination monitoring unit 81 monitors water drop region information stored in the water drop region storage unit 71 and detects a region where a water drop is eliminated (water drop elimination region, in the following) from a temporal change in the water drop region information. Then, the water drop elimination monitoring unit 81 outputs information indicating a water drop elimination region (water drop elimination region information, in the following).

The mud elimination monitoring unit 82 monitors mud region information stored in the mud region storage unit 72 and detects a region where mud is eliminated (mud elimination region, in the following) from a temporal change in the mud region information. Then, the mud elimination monitoring unit 82 outputs information indicating a mud elimination region (mud elimination region information, in the following).

The attached-object detection control unit 11 includes a state switching table 17 in which a condition for switching operations of the water drop detection unit 61 and the mud detection unit 62 is described. The attached-object detection control unit 11 performs the following two operations when determining that there is correspondence to the condition described in the state switching table 17. A first operation is outputting, to the attached-object detection unit 6, a command for switching an operation, that is, an operation command indicating switching to an operated state or an operation command indicating switching to a stopped state. A second operation is outputting information of an operation state of the attached-object detection unit 6 to the attached-object elimination management unit 12. As described later, the conditions described in the state switching table 17 include a vehicle speed of the vehicle 1.

FIG. 4 is a view illustrating an example of the state switching table 17. The state switching table 17 includes a column of a processing name 171, a column of a state 172, and a column of a state switching condition 173. Processing to be controlled is described in the column of the processing name 171, and "water drop detection" indicates that the water drop detection unit 61 is to be controlled and "mud detection" indicates that the mud detection unit 62 is to be controlled. A state after switching is described in the column of the state 172, and "stopped" indicates that switching to a stopped state is performed and "operated" indicates that switching to an operated state is performed. A switching condition is described in the column of the state switching condition 173. For example, the second row in FIG. 4 indicates that the water drop detection unit 61 is stopped when a vehicle speed of the vehicle 1 exceeds 2 km/h. Note that when determining whether it is day or night, the attached-object detection control unit 11 may refer to a clock (not illustrated) included in the vehicle 1 or the in-vehicle device 4 or may use illuminance detected by the camera 2 or average luminance of a photographed image. Also, time to be a reference in determination whether it is day or night may vary depending on a season.

Referring back to FIG. 2, a description of the control block diagram of the in-vehicle device 4 is continued.

On the basis of an operation state of the attached-object detection unit 6 which state is input from the attached-object detection control unit 11, the attached-object elimination management unit 12 rewrites the attached-object region information of an attached-object region storage unit 7 corresponding to a detection unit in a stopped state by using attached-object elimination region information. For example, in a case where the water drop detection unit 61 is in an operated state and the mud detection unit 62 is in a stopped state, mud region information stored in the mud region storage unit 72 corresponding to the mud detection unit 62 in the stopped state is rewritten by utilization of attached-object elimination region information. That is, in this case, the mud region information is rewritten by utilization of water drop elimination region information. Rewriting of attached-object region information will be described in detail with reference to FIG. 3, FIG. 5, and FIG. 6.

Figure 5:
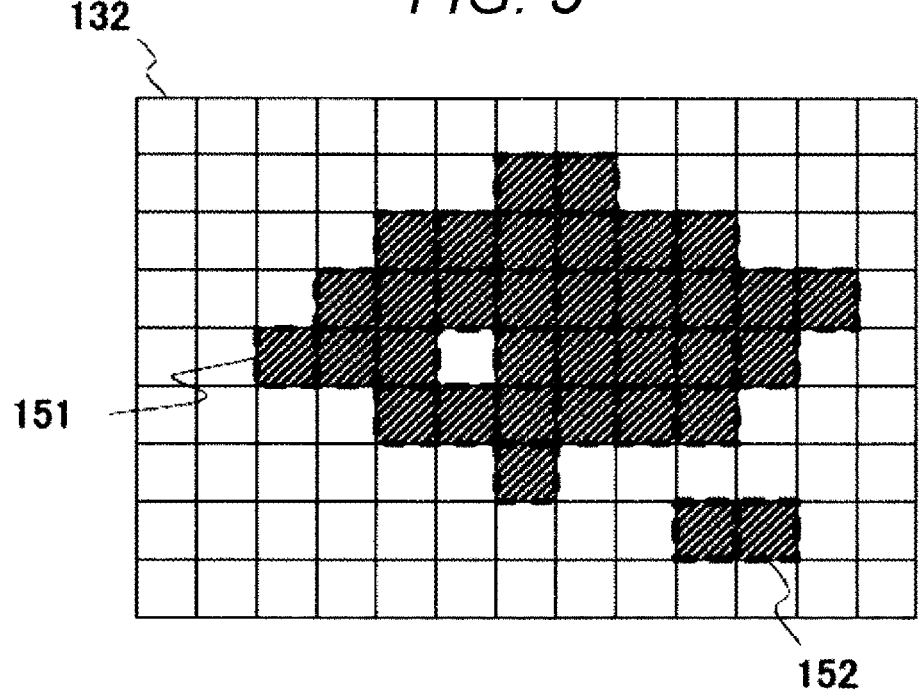
FIG. 5 is a view illustrating a mud region.

FIG. 5 is a view illustrating mud regions 151 and 152 detected previously by the mud detection unit 62 in the stopped state. The mud regions 151 and 152 are displayed as regions on a detection surface 132 that is a photographed image divided in a grid manner.

Figure 6:
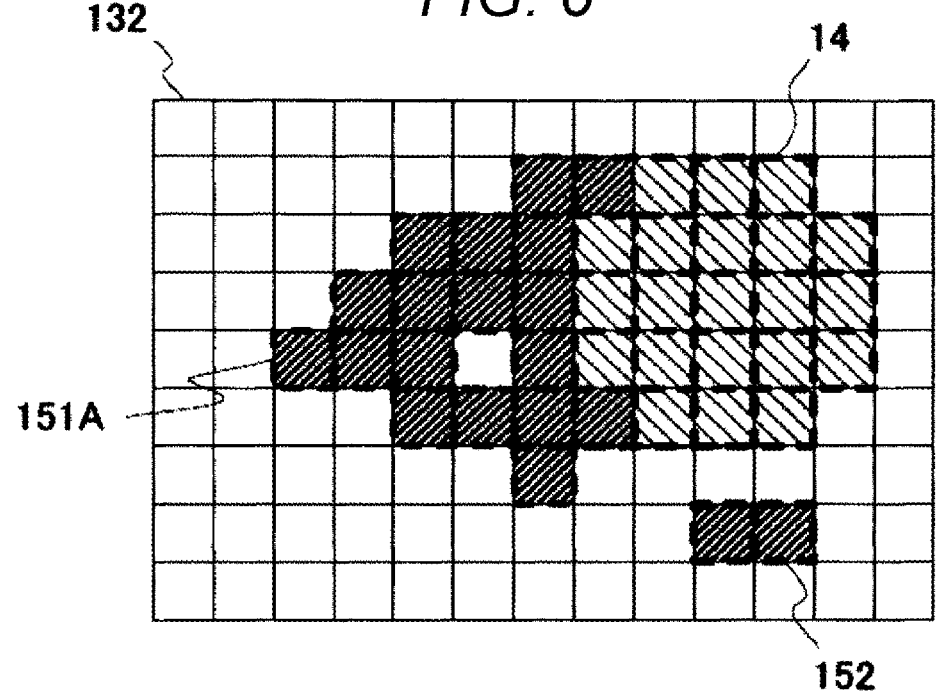
FIG. 6 is a view illustrating a mud region rewritten by an attached-object elimination storage unit.

FIG. 6 is a view illustrating a mud region indicated by mud region information rewritten by the attached-object elimination management unit 12. FIG. 6 is generated through the following processing.

First, the mud detection unit 62 detects a mud region from a photographed image and outputs mud region information to the attached-object region storage unit 7. This mud region information is illustrated as the region 151 and the region 152 in FIG. 5. Next, the mud detection unit 62 is switched to the stopped state by the attached-object detection control unit 11. Then, the water drop elimination monitoring unit 81 detects the region 14, which is illustrated in FIG. 3, as a water drop elimination region. Then, the attached-object elimination management unit 12 excludes the region 14, which is the water drop elimination region, from the mud region 151 and region 152 illustrated in FIG. 5. Accordingly, the mud region 151 illustrated in FIG. 5 is rewritten into a mud region 151A in FIG. 6 and is output to the attached-object region storage unit 7 as new mud region information along with the mud region 152 that is not rewritten.

Referring back to FIG. 2, a description of the control block diagram of the in-vehicle device 4 is continued.

The attached-object region integration unit 9 acquires water drop region information and mud region information from the attached-object region storage unit 7. The attached-object region integration unit 9 integrates, as an integrated attached-object region, a water drop region and a mud region included in the acquired information and outputs integrated attached-object region information that is information indicating the integrated attached-object region to the control signal outputting unit 10.

The control signal outputting unit 10 generates a control signal to drive the annunciation unit 5 on the basis of the input integrated attached-object region information and performs an output thereof to the annunciation unit 5. For example, the control signal outputting unit 10 generates a specific control signal in a case where an area of the integrated attached-object region indicated by the integrated attached-object region information is larger than a predetermined area. This specified control signal is a control signal for the annunciation unit 5 to give an alarm to a passenger of a vehicle to wipe an attached object on the lens of the camera 2.

(Water Drop Detection Processing)

Figure 7:
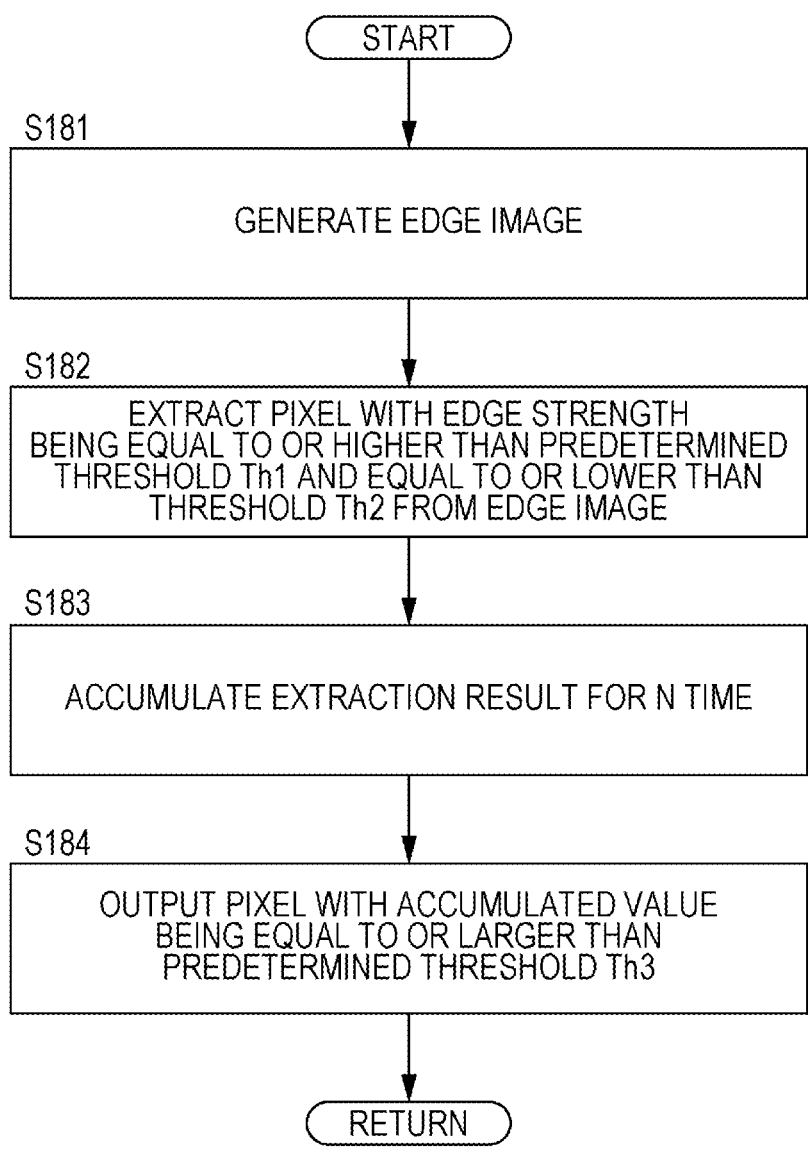
FIG. 7 is a flowchart illustrating processing by a water drop detection unit.

FIG. 7 is a flowchart illustrating processing by the water drop detection unit 61. An execution subject of each step described in the following is the CPU of the arithmetic processing unit 41. In step S181, the CPU performs edge extraction processing with respect to a photographed image output from the camera 2 and generates an edge image. For the edge extraction processing, various means to extract a change amount in an image can be used. For example, a Prewitt filter or a Sobel filter can be used. In following step S182, the CPU extracts a blurred pixel with low edge strength from the edge image generated in step S181. The CPU extracts an edge which is included in the edge image and edge strength of which is equal to or higher than a predetermined threshold Th1 and equal to or lower than a threshold Th2. In following step S183, the CPU accumulates an extraction result in step S182 for the predetermined number of times N for each pixel. In following step S184, the CPU specifies a pixel in which the edge strength accumulated in step S183 is equal to or higher than a predetermined threshold Th3, and outputs information indicating the pixel as water drop region information to the attached-object region storage unit 7.

(Mud Detection Processing)

Figure 8:
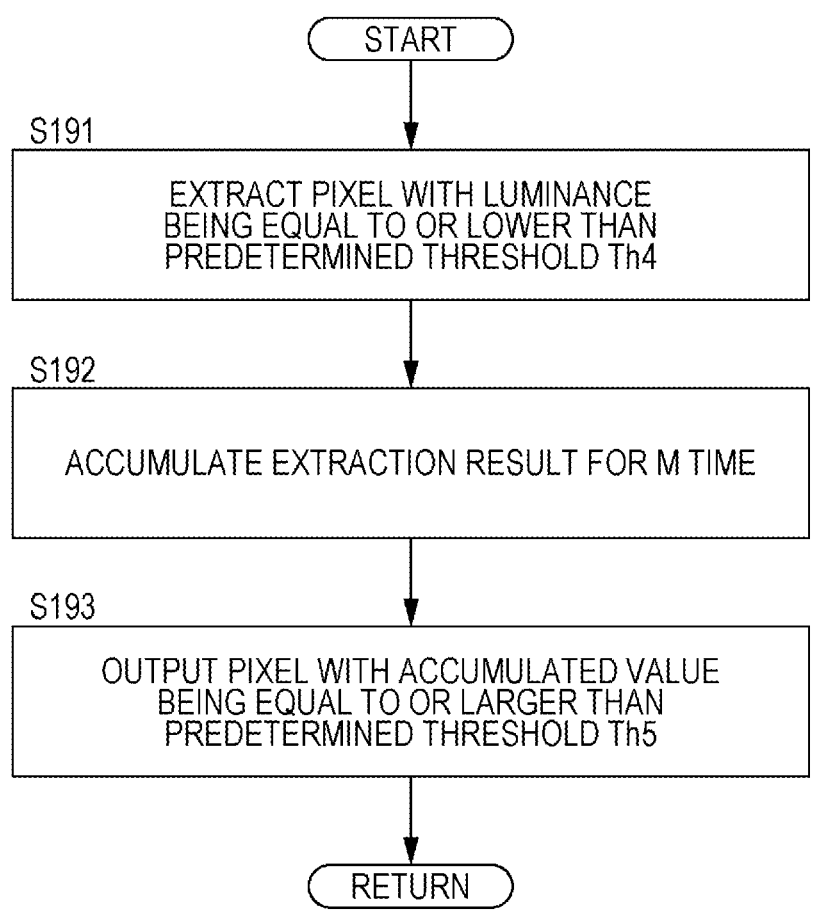
FIG. 8 is a flowchart illustrating processing by a mud detection unit.

FIG. 8 is a flowchart illustrating processing by the mud detection unit 62. An execution subject of each step described in the following is the CPU of the arithmetic processing unit 41. In step S191, the CPU extracts a pixel, luminance of which is equal to or lower than a predetermined threshold Th4, in a photographed image output from the camera 2. In following step S192, the CPU accumulates an extraction result in step S191 for the predetermined number of times M for each pixel. In following step S193, the CPU outputs information, which indicates a pixel with the luminance value accumulated in step S192 being equal to or larger than a predetermined threshold Th5, as mud region information to the attached-object region storage unit 7.

(Operation of Attached-Object Elimination Management Unit)

Figure 9:
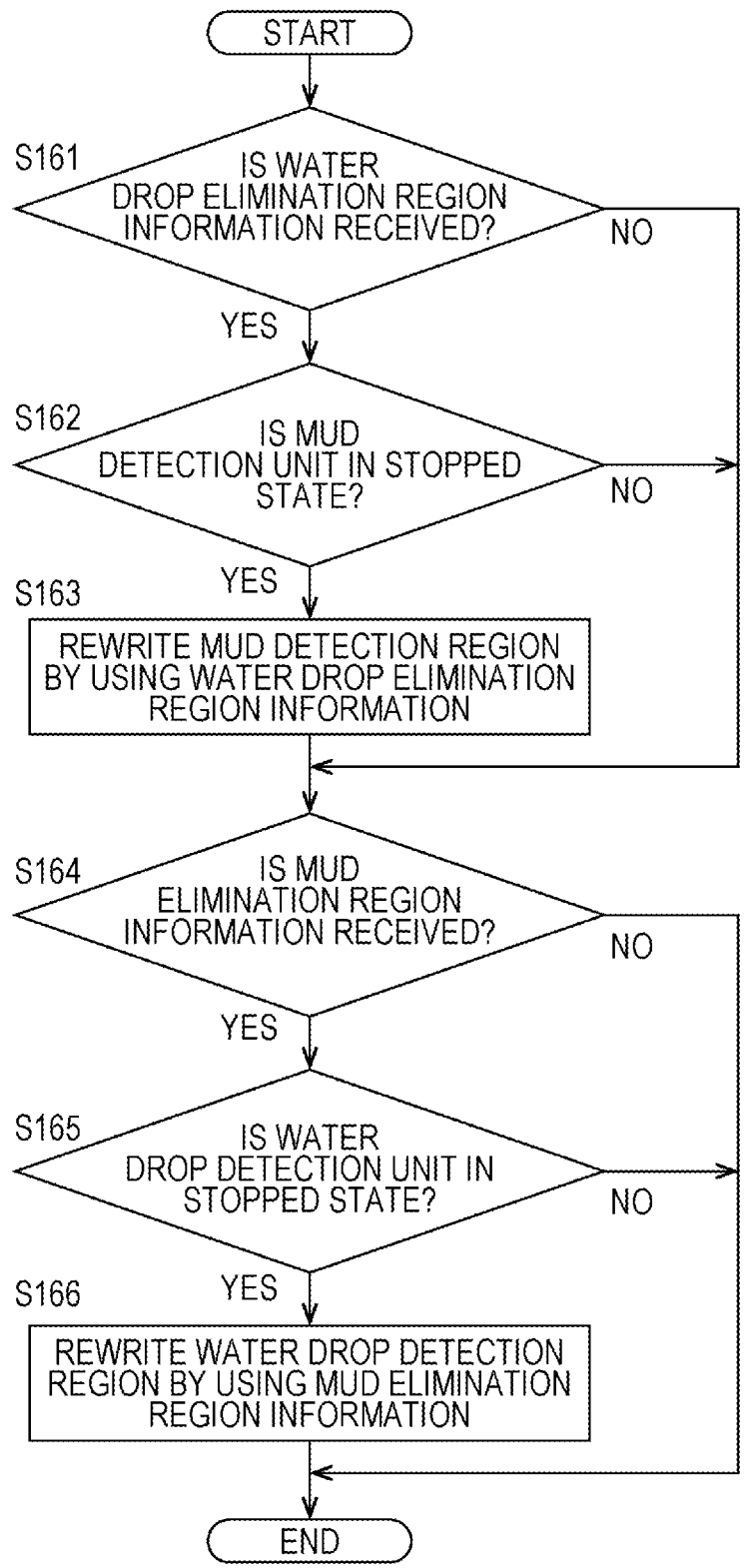
FIG. 9 is a flowchart illustrating processing by an attached-object elimination management unit.

FIG. 9 is a flowchart illustrating processing by the attached-object elimination management unit 12. An execution subject of each step described in the following is the CPU of the arithmetic processing unit 41.

In step S161, the CPU determines whether the attached-object elimination management unit 12 receives water drop elimination region information from the water drop elimination monitoring unit 81. The processing advances to step S162 in a case where it is determined that the water drop elimination region information is received, and advances to step S164 in a case where it is determined that the water drop elimination region information is not received. In step S162, the CPU determines whether the mud detection unit 62 is in a stopped state on the basis of an output from the attached-object detection control unit 11. This determination is performed on the basis of information of an operation state of the attached-object detection unit 6 which information is output from the attached-object detection control unit 11. The processing advances to step S163 in a case where it is determined that the mud detection unit 62 is in the stopped state, and advances to step S164 in a case where it is determined that the mud detection unit 62 is not in the stopped state, that is, the mud detection unit 62 is in an operated state. In step S163, the CPU rewrites mud region information on the basis of the water drop elimination region information and goes to step S164.

In step S164, the CPU determines whether the attached-object elimination management unit 12 receives mud elimination region information from the mud elimination monitoring unit 82. The processing illustrated in FIG. 9 advances to step S165 in a case where it is determined that the mud elimination region information is received, and is ended in a case where it is determined that the water drop elimination region information is not received. In step S165, the CPU determines whether the water drop detection unit 61 is in a stopped state on the basis of an output from the attached-object detection control unit 11. The processing illustrated in FIG. 9 advances to step S166 in a case where it is determined that the water drop detection unit 61 is in the stopped state, and is ended in a case where it is determined that the water drop detection unit 61 is not in the stopped state, that is, the water drop detection unit 61 is in an operated state. In step S166, the CPU rewrites water drop region information on the basis of the mud elimination region information and ends the processing illustrated in FIG. 9.

According to the above-described first embodiment, the following effects are acquired.

(1) An in-vehicle device 4 includes an image acquisition unit 42 that acquires an image photographed by a camera 2 including a lens, a storage unit, that is, an arithmetic processing unit 41, a dirt detection unit, that is, an attached-object detection unit 6 that detects dirt on the lens on the basis of the image acquired by the image acquisition unit 42 and that stores dirt region information indicating a region where the dirt exists in the image into the storage unit, a dirt removal information generation unit, that is, an attached-object elimination monitoring unit 8 that generates dirt removal information indicating a region where the dirt on the lens is removed, and a rewriting unit, that is, an attached-object elimination management unit 12 that rewrites the dirt region information on the basis of the dirt removal information.

Since the in-vehicle device 4 has such a configuration, it is possible to rewrite dirt region information on the basis of dirt removal information even in a state in which dirt detection cannot be performed by the dirt detection unit. For example, even in a case where a mud detection unit 62 cannot be operated since a vehicle speed is lower than 1 km/h during the day, it is possible to rewrite a mud region storage unit 72 on the basis of attached-object elimination region information, that is, dirt removal information output from a water drop elimination monitoring unit 81 that uses a detection result of a water drop detection unit 61.

(2) The water drop detection unit 61 and the mud detection unit 62 operate as the dirt detection unit in some cases and operate as a part of the dirt removal information generation unit in some cases. That is, different algorithms are respectively used for the dirt detection unit and the dirt removal information generation unit. For example, in a case where an operation of the mud detection unit 62 is stopped, the water drop elimination monitoring unit 81 outputs attached-object elimination region information on the basis of a detection result of the water drop detection unit 61, and the attached-object elimination management unit 12 rewrites the mud region storage unit 72 on the basis of this, the mud detection unit 62 is the dirt detection unit and the water drop detection unit 61 is a part of the dirt removal information generation unit.

In such a manner, since the dirt detection unit and the dirt removal information generation unit are operated by different algorithms, dirt removal information can be generated by the dirt removal information generation unit even in a case where it is not possible to detect dirt by an algorithm of the dirt detection unit, that is, in a case where it is not possible to detect a removal of dirt by the algorithm of the dirt detection unit.

(3) The dirt removal information generation unit, that is, the attached-object elimination monitoring unit 8 generates dirt removal information on the basis of a detection result of a different kind of dirt detection unit that detects dirt of a kind different from that of dirt that can be detected by the dirt detection unit.

The in-vehicle device 4 includes two kinds of dirt detection units and can rewrite a dirt detection region, which is detected by one dirt detection unit, with dirt removal information using a detection result of the other dirt detection unit.

(4) A dirt detection unit such as the mud detection unit 62 detects mud and a different kind of dirt detection unit such as the water drop detection unit 61 detects a water drop.

Thus, a mud region detected by the mud detection unit 62 can be rewritten by utilization of a mud elimination region using a detection result of the water drop detection unit 61.

(5) In a case where the dirt detection unit, that is, the water drop detection unit 61 or the mud detection unit 62 is not operated, the rewriting unit, that is, the attached-object elimination management unit 12 rewrites dirt region information, that is, water drop region information or mud region information output from the non-operated dirt detection unit on the basis of dirt removal information. Thus, by using a detection result of one attached-object detection unit 6 that is operated, it is possible to rewrite a dirt region detected by the other attached-object detection unit 6 that is not operated.

(6) The in-vehicle device 4 includes a state switching table 17 indicating correspondence between a vehicle speed of a vehicle 1 including the camera 2 and existence/non-existence of an operation of the dirt detection unit, and an operation switching unit, that is, the attached-object detection control unit 11 that operates or stops the dirt detection unit on the basis of a vehicle speed of the vehicle 1, which speed is input from a vehicle monitoring unit 3, and the state switching table 17. The rewriting unit, that is, the attached-object elimination management unit 12 determines whether there is an operation of the attached-object detection unit 6 on the basis of an operation state of the vehicle 1 and the state switching table 17.

Thus, the attached-object elimination management unit 12 can determine which of water drop region information and mud region information is to be rewritten.

The embodiment described above may be modified in the following manner.

First Modification Example of First Embodiment

A vehicle monitoring unit 3 of a vehicle 1 and an attached-object detection control unit 11 of an in-vehicle device 4 may be omitted. In this case, an attached-object elimination management unit 12 rewrites attached-object region information of a water drop region storage unit 71 and a mud region storage unit 72 on the basis of attached-object elimination region information regardless of an operation state of a water drop detection unit 61 and a mud detection unit 62.

Second Modification Example of First Embodiment

An attached-object detection control unit 11 may control an operation of a water drop detection unit 61 and a mud detection unit 62 with reference to a state of a manual switch that can be operated by a passenger of a vehicle 1 instead of referring to a state switching table 17.

Third Modification Example of First Embodiment

An in-vehicle device 4 may not include any one of a water drop elimination monitoring unit 81 and a mud elimination monitoring unit 82. That is, an attached-object elimination monitoring unit 8 may generate attached-object elimination region information by using only a detection result of any one of a water drop detection unit 61 and a mud detection unit 62.

Note that the attached-object elimination monitoring unit 8 preferably includes the water drop elimination monitoring unit 81.

Second Embodiment

A second embodiment of an in-vehicle device according to the present invention will be described with reference to FIG. 10 to FIG. 11. In the following description, the same sign is assigned to a configuration element that is the same with that of the first embodiment, and a different point will be mainly described. A point that is not specifically described is the same with the first embodiment. The present embodiment is different from the first embodiment mainly in a point that attached-object elimination region information is generated on the basis of a result of image recognition and in a point that it is changed according to a condition which attached-object elimination region information by which generation method is used to rewrite an attached-object region storage unit 7.

A hardware configuration of each of a vehicle 1 and an in-vehicle device 4 in the second embodiment is similar to that of the first embodiment. A program stored in a ROM of an arithmetic processing unit 41 is different from that of the first embodiment.

(Control Block)

Figure 10:
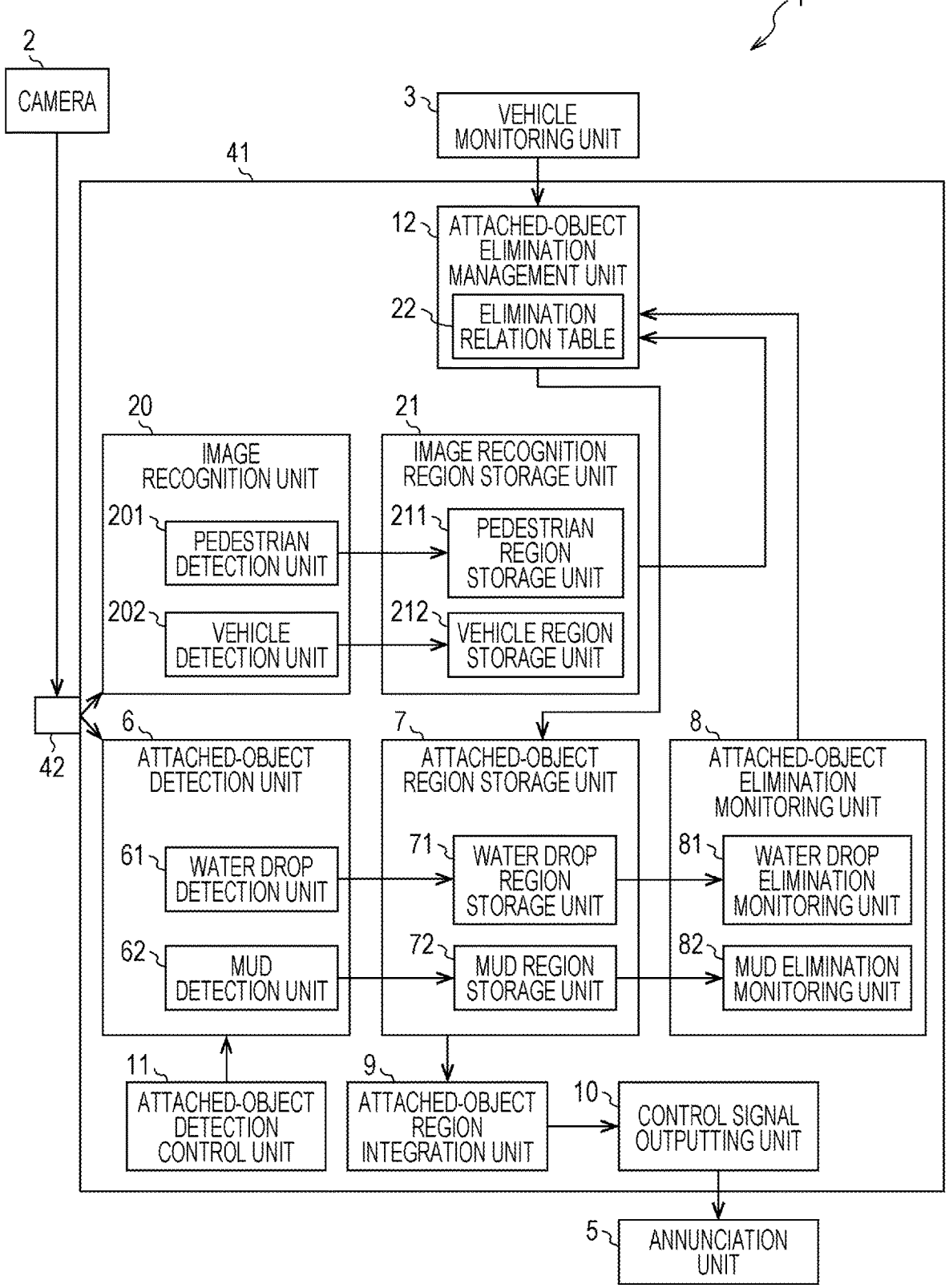
FIG. 10 is a control block diagram of an in-vehicle device in a second embodiment.

FIG. 10 is a control block diagram of the in-vehicle device 4 in the second embodiment of the present invention. An arithmetic processing unit 41 functions as an image recognition unit 20, an image recognition region storage unit 21, an attached-object detection unit 6, an attached-object region storage unit 7, an attached-object elimination monitoring unit 8, an attached-object region integration unit 9, a control signal outputting unit 10, and an attached-object elimination management unit 12.

A different point between the control block diagram illustrated in FIG. 10 and the control block diagram in the first embodiment is that the image recognition unit 20 and the image recognition region storage unit 21 are added and that an output from the image recognition region storage unit 21 and that from a vehicle monitoring unit 3 are input into the attached-object elimination management unit 12. Note that a line that connects the vehicle monitoring unit 3 and an attached-object detection control unit 11 is omitted in FIG. 10. However, similarly to the first embodiment, an output from the vehicle monitoring unit 3 is input into the attached-object detection control unit 11. Also, a point that the attached-object detection control unit 11 includes a state switching table 17 is similar to the first embodiment. In the following, these different points will be described.

The image recognition unit 20 includes a pedestrian detection unit 201 that detects a pedestrian from a photographed image, and a vehicle detection unit 202 that detects a vehicle from the photographed image. A region of the pedestrian, which is detected by the pedestrian detection unit 201, on the photographed image and a region of the vehicle, which is detected by the vehicle detection unit 202, on the photographed image are called an "image recognition region" in the following.

The pedestrian detection unit 201 and the vehicle detection unit 202 respectively detect a pedestrian and a vehicle from the photographed image by using a known image processing method. For this image processing, for example, a method of extracting a Hog feature amount from an image and extracting a region corresponding to a feature amount of a pedestrian or a vehicle, or a method of detecting a pedestrian or a vehicle by using deep learning can be used. Each of the pedestrian detection unit 201 and the vehicle detection unit 202 outputs, to the image recognition region storage unit 21, information of an image recognition region such as a position, shape, or size of a detected object on a photographed image as image recognition information.

The image recognition region storage unit 21 includes a pedestrian region storage unit 211 and a vehicle region storage unit 212. The pedestrian region storage unit 211 stores the latest image recognition information input from the pedestrian detection unit 201. The vehicle region storage unit 212 stores the latest image recognition information input from the vehicle detection unit 202. In a case where an operation of the image recognition unit 20 is stopped, the image recognition region storage unit 21 eliminates the image recognition information. It is because when previously-output image recognition information is held, erroneous determination is made that a pedestrian or a vehicle is currently recognized although none is currently recognized.

In addition to attached-object elimination region information detected by the attached-object elimination monitoring unit 8, image recognition information stored in the image recognition region storage unit 21 and an operation situation of a vehicle such as a vehicle speed from the vehicle monitoring unit 3 are input into the attached-object elimination management unit 12.

The attached-object elimination management unit 12 includes an elimination relation table 22. The attached-object elimination management unit 12 rewrites water drop region information and mud region information stored in the attached-object region storage unit 7 on the basis of the elimination relation table 22. The elimination relation table 22 is a table for specification of information to be rewritten according to a processing result of each of the attached-object detection unit 6 and the image recognition unit 20 on the basis of a period of time, and an operation situation of a vehicle which situation is input from the vehicle monitoring unit 3. Note that it can be said that the elimination relation table 22 indicates a condition for the attached-object elimination management unit 12 to be operated.

FIG. 11 is a view illustrating an example of the elimination relation table 22. The elimination relation table 22 includes a column of a period of time 221, a column of a vehicle speed 222, a column of a processing name 223, and a column of an elimination region reflected object 224. In the column of the period of time 221, information indicating a division of time such as day or night is described. In the column of the vehicle speed 222, a condition for a vehicle speed of the vehicle 1 is described. In the column of the processing name 223, a name of any detection unit of the attached-object detection unit 6 and the image recognition unit 20 is described. In the column of the elimination region reflected object 224, a storage region to be rewritten, that is, any of a water drop region storage unit 71 and a mud region storage unit 72 is described.

For example, the following is indicated according to the second row of the elimination relation table 22 in FIG. 11. That is, in a case where traveling is performed at a vehicle speed of 20 km/h during the day, it is assumed that mud in a region, which corresponds to a water drop elimination region detected by a water drop elimination monitoring unit 81, in a mud region stored in the mud region storage unit 72 is removed and mud region information indicating that mud is attached to the region is eliminated from the mud region storage unit 72. Note that the period of time 221 and the vehicle speed 222 are used as conditions of changing an elimination region reflected object. However, these are not the limitation. Also, an operation state or the like of each detection unit of the attached-object detection unit 6 can be used.

By appropriately setting the elimination relation table 22, with an elimination region of an attached object detected by a different attached-object detection unit that corresponds to the state switching condition in FIG. 4 and that is currently operated, it is possible to eliminate an attached-object region that is stored by an attached-object detection unit, which corresponds to the state switching condition in FIG. 4 and which is currently stopped, during operation before stoppage. Also, a wiping relationship according to a kind of an attached object can be reflected to the elimination relation table 22. For example, since a water drop makes many attached objects including mud come off and washes these away, a water drop elimination region acquired by water drop detection processing can be easily used for elimination of a dirt region acquired by different dirt detection processing. However, mud has a property of being easily mixed with a different attached object and it is difficult to use a mud elimination region acquired by mud detection processing for elimination of a dirt region acquired by different dirt detection processing.

According to the above-described second embodiment, it is possible to acquire the following effects in addition to the effects of (1) to (5) in the first embodiment.

(1) A dirt detection unit, that is, an attached-object detection unit 6 of an in-vehicle device 4 includes a water drop detection unit 61 and a mud detection unit 62 that detect different kinds of dirt. The water drop detection unit 61 stores detected dirt as water drop region information into a storage unit and the mud detection unit 62 stores detected dirt as mud region information into a storage unit. The in-vehicle device 4 includes a water drop elimination monitoring unit 81 that generates water drop elimination region information on the basis of the water drop region information, a mud elimination monitoring unit 82 that generates mud elimination region information on the basis of the mud region information, and a table storage unit, that is, an arithmetic processing unit 41 that stores an elimination relation table 22 in which a condition for rewriting the water drop region information and a condition for rewriting the mud region information are described. A rewriting unit, that is, an attached-object elimination management unit 12 rewrites the mud region information on the basis of the condition described in the elimination relation table 22 and the water drop elimination region information and rewrites the water drop region information on the basis of the condition described in the elimination relation table 22 and the mud elimination region information.

Thus, it is possible to rewrite the water drop region information and the mud region information respectively on the basis of detection results of the mud detection unit 62 and the water drop detection unit 61.

(2) The condition for rewriting water drop region information and the condition for rewriting mud region information which conditions are described in the elimination relation table 22 at least include a speed of a vehicle 1 including a camera 2.

Thus, it is possible to change an attached-object region to be rewritten according to a speed of the vehicle 1.

(3) The in-vehicle device 4 includes an image recognition unit 20 that recognizes an object from a photographed image from the camera 2 and that generates dirt removal information in which a region where the object is recognized is a region where dirt on the lens is removed.

Thus, it is possible to rewrite attached-object region information by using a recognition result of the image recognition unit 20.

(4) The in-vehicle device 4 includes the table storage unit, that is, the arithmetic processing unit 41 that stores the elimination relation table 22 indicating a condition for the attached-object elimination management unit 12 to be operated. The elimination relation table 22 at least includes a speed of the vehicle 1 including the camera 2. The attached-object elimination management unit 12 is operated on the basis of a speed of the vehicle 1 and the elimination relation table 22.

Thus, the in-vehicle device 4 can rewrite attached-object region information by using a recognition result of the image recognition unit 20 or a detection result of the attached-object detection unit 6 on the basis of the speed of the vehicle 1 and the elimination relation table 22.

The second embodiment described above can be modified and executed in the following manner.

First Modification Example of Second Embodiment

An in-vehicle device 4 may not include an image recognition unit 20 and an image recognition region storage unit 21. In this case, a point different from the first embodiment is that an attached-object elimination management unit 12 rewrites attached-object region information stored in an attached-object region storage unit 7 on the basis of an elimination relation table 22 instead of an operation state of an attached-object detection unit 6. Similarly, it is possible to omit an attached-object elimination monitoring unit 8 in the in-vehicle device 4. In this case, on the basis of the elimination relation table 22, the attached-object elimination management unit 12 eliminates a region of image recognition information, which is input from an image recognition region storage unit 21, from attached-object region information described in the attached-object region storage unit 7.

Second Modification Example of Second Embodiment

An attached-object elimination management unit 12 may not refer to a column of a vehicle speed 222 in an elimination relation table 22. Moreover, the attached-object elimination management unit 12 may not refer to a column of a period of time in the elimination relation table 22. In these cases, the elimination relation table 22 may not include a column that is not referred to by the attached-object elimination management unit 12.

Third Modification Example of Second Embodiment

In each of an attached-object detection unit 6 and an image recognition unit 20, certainty, that is, accuracy of a detection result varies. Moreover, accuracy varies in each pixel in each detection result. Thus, accuracy of a detection result is added to an output from each of the attached-object detection unit 6, an attached-object elimination monitoring unit 8, and the image recognition unit 20. Then, an attached-object elimination management unit 12 may consider accuracy when eliminating attached-object information stored in an attached-object region storage unit 7.

In step S184 in FIG. 7, a water drop detection unit 61 of the attached-object detection unit 6 sets a pixel with an accumulated value being equal to or larger than Th3 as a water drop region. Accuracy can be determined by utilization of the accumulated value. The water drop detection unit 61 sets that accuracy is high, that is, a detection result is more likely to be certain as an accumulated value becomes large.

In step S193 in FIG. 8, a mud detection unit 62 of the attached-object detection unit 6 sets a pixel with an accumulated value being equal to or larger than Th5 as a mud region. Accuracy can be determined by utilization of the accumulated value. The mud detection unit 62 sets that accuracy is high, that is, a detection result is more likely to be certain as an accumulated value becomes large.

When determining that a water drop in a certain pixel is eliminated, a water drop elimination monitoring unit 81 of the attached-object elimination monitoring unit 8 sets accuracy, which is set in the pixel before the elimination, as accuracy of elimination of a water drop in the pixel. Similarly, when determining that mud in a certain pixel is eliminated, a mud elimination monitoring unit 82 sets accuracy, which is set in the pixel before the elimination, as accuracy of elimination of mud in the pixel.

Each detection unit of the image recognition unit 20 assigns, to a detected image recognition region, certainty of the detection as accuracy information, makes each storage unit of an image recognition region storage unit 21 store this, and inputs this into the attached-object elimination management unit 12. The attached-object elimination management unit 12 assigns positive weight corresponding to accuracy to each image recognition region and assigns negative weight corresponding to accuracy to each attached-object elimination region. Then, the attached-object elimination management unit 12 extracts a region in which the sum of the weight is equal to or smaller than a predetermined value and eliminates the extracted region from the attached-object region storage unit 7 on the basis of the elimination relation table 22 in the above-described manner.

The following effect can be acquired according to this modification example.

(1) Accuracy information indicating certainty of removal of dirt is added for each region in dirt removal information and the attached-object elimination management unit 12 rewrites dirt region information on the basis of the accuracy information.

Thus, it is possible to rewrite dirt region information in consideration of accuracy.

Fourth Modification Example of Second Embodiment

An image recognition unit 20 only needs to be able to detect some kind of object from a photographed image from a camera 2 and a kind or the number of detection objects are not limited to the above configuration. For example, an image recognition unit 20 may include only a pedestrian detection unit 201 or may include a detection unit that detects a traffic light or a guard rail in addition to a pedestrian or a vehicle.

Third Embodiment

A third embodiment of an in-vehicle device according to the present invention will be described with reference to FIG. 12 to FIG. 13. In the following description, the same sign is assigned to a configuration element that is the same with that of the second embodiment, and a different point will be mainly described. A point that is not specifically described is the same with the second embodiment. The present embodiment is different from the second embodiment mainly in a point that an attached-object detection unit that detects an elimination point of an attached object without limitation to a specific kind of dirt is included.

A hardware configuration of each of a vehicle 1 and an in-vehicle device 4 in the third embodiment is similar to that of the second embodiment. A program stored in a ROM of an arithmetic processing unit 41 is different from that of the second embodiment.

(Control Block)

Figure 12:
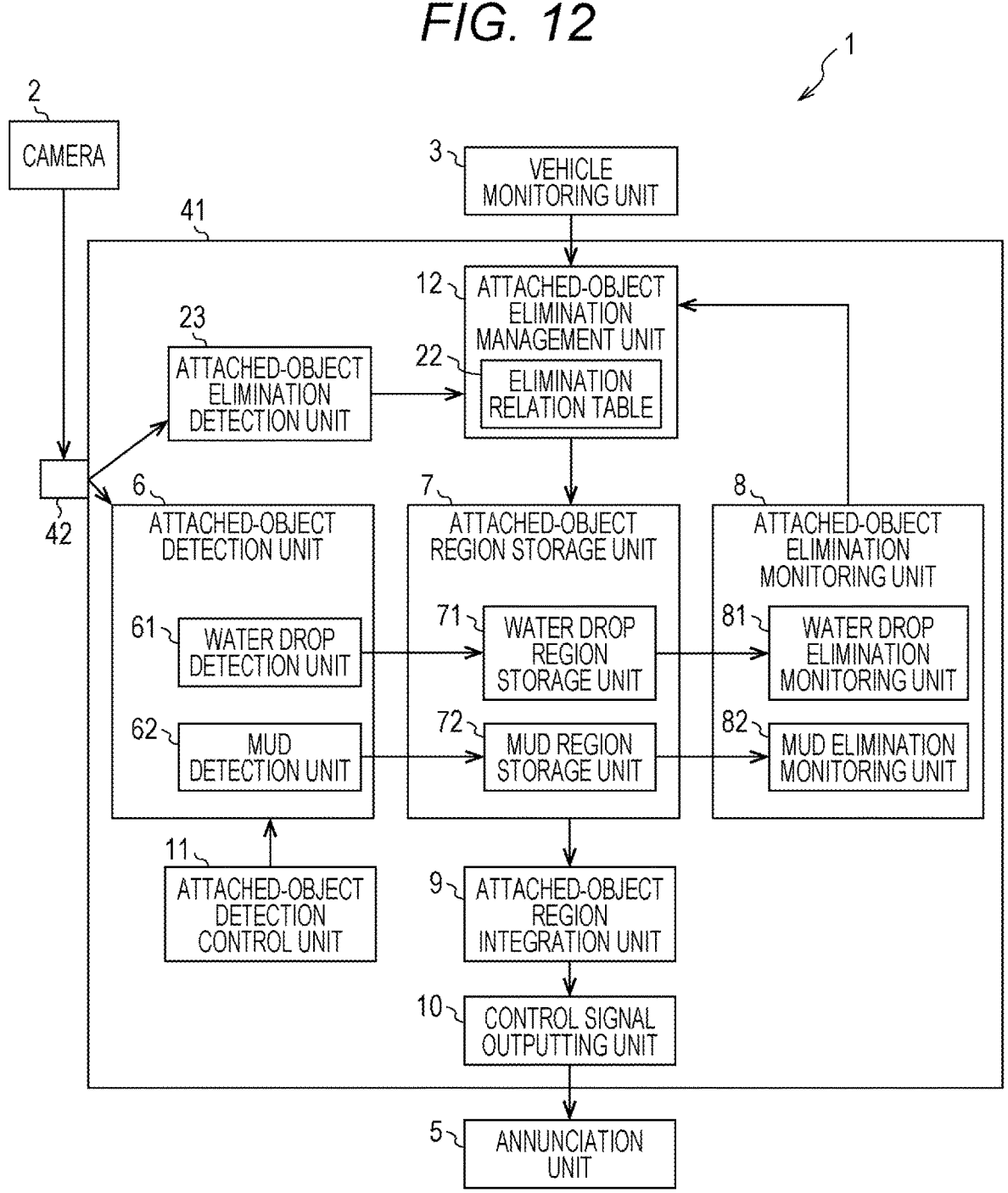
FIG. 12 is a control block diagram of an in-vehicle device in a third embodiment.

FIG. 12 is a control block diagram of the in-vehicle device 4 in the third embodiment of the present invention. An arithmetic processing unit 41 includes an attached-object elimination detection unit 23, an attached-object detection unit 6, an attached-object region storage unit 7, an attached-object elimination monitoring unit 8, an attached-object region integration unit 9, a control signal outputting unit 10, and an attached-object elimination management unit 12.

A point different from the control block diagram in the second embodiment is that an image recognition unit 20 and an image recognition region storage unit 21 are omitted, an attached-object elimination detection unit 23 is added, and an output from the attached-object elimination detection unit 23 is input into the attached-object elimination management unit 12. Note that a line that connects a vehicle monitoring unit 3 and an attached-object detection control unit 11 is omitted in FIG. 12. However, similarly to the second embodiment, an output from the vehicle monitoring unit 3 is input into the attached-object detection control unit 11. Also, a point that the attached-object detection control unit 11 includes a state switching table 17 is similar to the second embodiment. In the following, these different points will be described.

The attached-object elimination detection unit 23 detects a region, in which an attached object is removed, from a photographed image input from a camera 2. The attached-object elimination detection unit 23 detects, for example, a region where an attached object is removed (attached-object elimination detection region, in the following) by using a temporal change in the photographed image input from the camera 2, and outputs attached-object elimination detection region information indicating the region to the attached-object elimination management unit 12.

With reference to an operation situation of the vehicle 1 which situation is input from the vehicle monitoring unit 3 and an elimination relation table 22, the attached-object elimination management unit 12 rewrites a water drop region and a mud region of the attached-object region storage unit 7 on the basis of attached-object elimination region information input from the attached-object elimination monitoring unit 8 and attached-object elimination detection region information input from the attached-object elimination detection unit 23. That is, in the present embodiment, the attached-object elimination region information and the attached-object elimination detection region information are dirt removal information.

In the elimination relation table 22 referred to by the attached-object elimination management unit 12, an elimination region reflected object 224 of the attached-object elimination detection unit 23 is set to both of water drop detection and mud detection. That is, both of water drop region information and mud region information are rewritten on the basis of the attached-object elimination detection region information output from the attached-object elimination detection unit 23.

(Flowchart of Attached-Object Elimination Detection Unit 23)

FIG. 13 is a flowchart illustrating an operation of the attached-object elimination detection unit 23. An execution subject of each step described in the following is a CPU of the arithmetic processing unit 41. In step 241, the CPU accumulates a photographed image output from the camera 2 for a long time, estimates that an attached object is attached to a region with no change, and extracts this as a no-change region. Note that processing in the present step is processing to detect an attached object on a lens of the camera 2 and a processing result of the attached-object detection unit 6 can be also used.

In following step 242, the CPU evaluates a difference such as a luminance difference in each pixel of two successive photographed images output from the camera 2. The CPU extracts, as an instantaneous change region, an aggregation of pixels with the difference being larger than a predetermined threshold. The extraction of an instantaneous change region in the present step intends the following. That is, when a photographing cycle of the camera 2 is adequately short, there is little change in two successive photographed images and a difference region is not usually extracted by the processing in step 242. However, at a moment at which an attached object is attached to the lens of the camera 2 or a moment at which the attached object is removed, a great change is generated in a position where the attached object is attached and the region is extracted as an instantaneous change region.

In following step 243, the CPU outputs, as an attached-object elimination detection region, a region that is included in the instantaneous change region extracted in step 242 and that is extracted as the no-change region in step 241.

According to the above-described third embodiment, the following effect can be acquired in addition to the effects of (1) to (5) in the first embodiment and the effects of (1), (2), and (4) in the second embodiment.

(1) An in-vehicle device 4 includes an instantaneous change detection unit, that is, an attached-object elimination detection unit 23 that detects, from a photographed image, a no-change region in which there is no change for a long time and an instantaneous change region in which a luminance difference between two photographed images acquired by successive photographing by the camera 2 is larger than a predetermined value and that generates dirt removal information with a region, which is included in the no-change region, in the instantaneous change region as a region where dirt on the lens is removed.

Thus, it is possible to rewrite attached-object region information by using an output from the attached-object elimination detection unit 23 with a simple operation.

The third embodiment described above can be modified and executed in the following manner.

First Modification Example of Third Embodiment

In the third embodiment, the attached-object elimination detection unit 23 detects a region where an attached object is removed. In other words, a region where no attached object is detected in the latest photographed image and where an attached object is detected in a previous photographed image is detected. However, a region where no attached object is detected (non attached-object region, in the following) may be detected without consideration of previous existence/non-existence of an attached object. Detection of a non attached-object region by an attached-object elimination detection unit 23 can be performed, for example, by utilization of a change in a photographed image, which is output from a camera 2, along with traveling of a vehicle.

FIG. 14 is a flowchart illustrating an operation of an attached-object elimination detection unit 23 in the present modification example. An execution subject of each step in the flowchart described in the following is a CPU of an arithmetic processing unit 41. In step 251, the CPU accumulates a photographed image output from the camera 2 for a certain period of time. In following step 252, the CPU divides a plurality of successive photographed images accumulated in step 251 into a plurality of regions and outputs a distribution value of luminance, that is, a degree of a temporal luminance variation in each of the regions. The plurality of regions is, for example, a total of one hundred regions that are a photographed image equally divided into ten in each of a vertical direction and a horizontal direction. In following step 253, the CPU refers to the output in step 252 and outputs, as a non attached-object region, a region where a distribution value of luminance is equal to or larger than a predetermined threshold Th6. It is because in a region with no attached object, luminance of the region in a photographed image changes along with traveling of a vehicle 1.

The following effect can be acquired according to the above-described modification example.

(1) An in-vehicle device 4 includes a non attached-object detection unit, that is, an attached-object elimination detection unit 23 that detects a region with no attached object from a photographed image and that generates dirt removal information on the basis of the detected region.

Since the in-vehicle device 4 does not determine whether an attached object exists previously, dirt removal information can be generated more simply.

Second Modification Example of Third Embodiment

An in-vehicle device 4 may include, as an attached-object elimination detection unit 23, the image recognition unit 20 and the image recognition region storage unit 21 in the second embodiment. In this case, a region of an object that is detected by the image recognition unit 20 from a photographed image, that is, an image recognition region is output as a non attached-object region to an attached-object elimination management unit 12. A reason why the image recognition region is output as the non attached-object region is as follows. That is, since the image recognition region is a region where an object is detected by the image recognition unit 20, it can be estimated that there is no attached object in the image recognition region.

Fourth Embodiment

A fourth embodiment of an in-vehicle device according to the present invention will be described with reference to FIG. 15 to FIG. 16. In the following description, the same sign is assigned to a configuration element that is the same with that of the second embodiment, and a different point will be mainly described. A point that is not specifically described is the same with the second embodiment. The present embodiment is different from the second embodiment mainly in a point that a region where a lens is cleaned is treated as a region where an attached object is eliminated.

A hardware configuration of an in-vehicle device 4 in the fourth embodiment is similar to that of the second embodiment. A program stored in a ROM of an arithmetic processing unit 41 is different from that of the second embodiment. A hardware configuration of the vehicle 1 includes, in addition to the configuration in the second embodiment, a device (not illustrated) that executes a program using a photographed image from a camera 2 (image utilization program, in the following) such as a program of detecting a white line from a photographed image and controlling the vehicle 1.

(Control Block)

Figure 15:
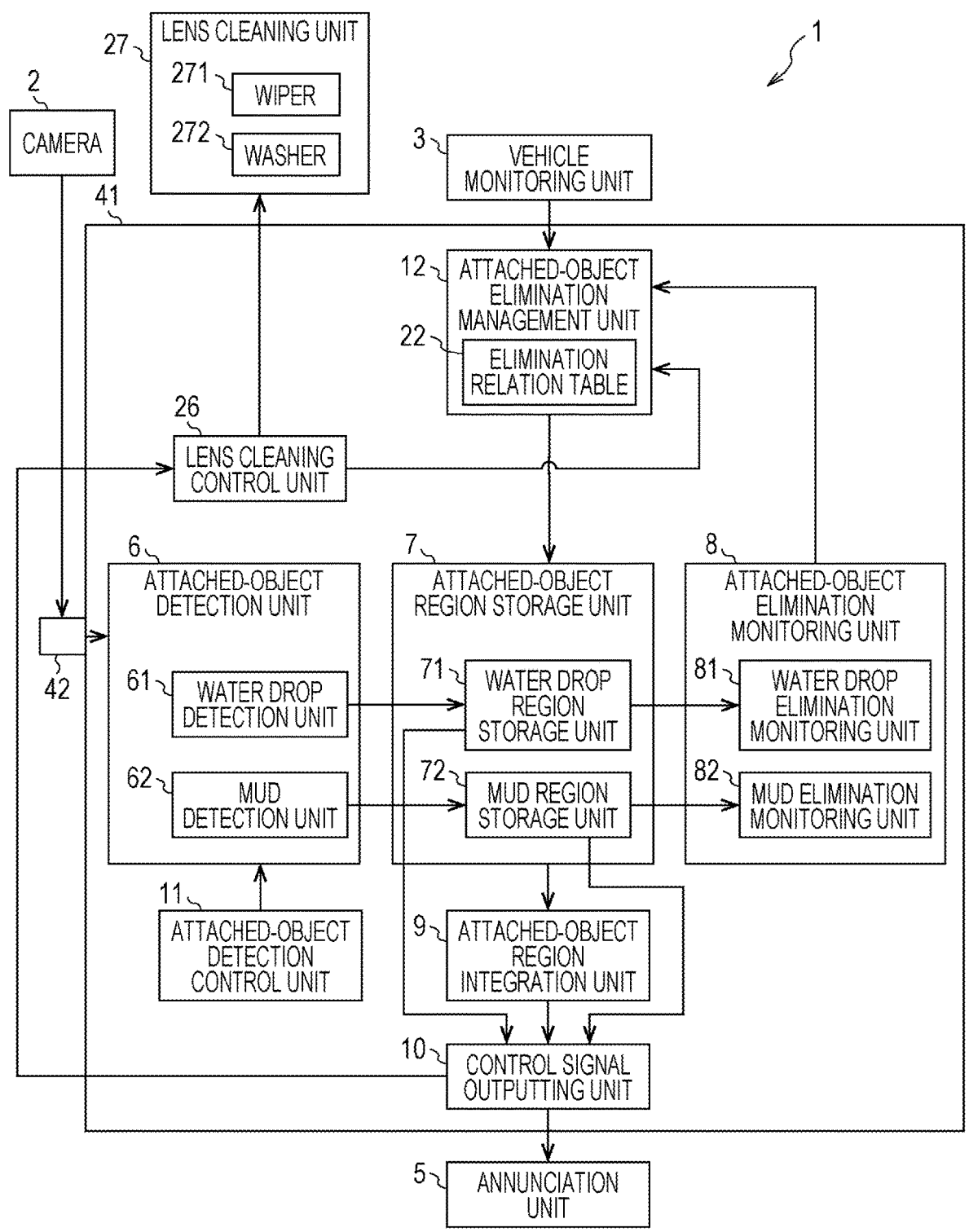
FIG. 15 is a control block diagram of an in-vehicle device in a fourth embodiment.

FIG. 15 is a control block diagram of an in-vehicle device 4 according to the fourth embodiment of the present invention. When a CPU executes a program stored in a ROM, an arithmetic processing unit 41 functions as a lens cleaning control unit 26, an attached-object detection unit 6, an attached-object region storage unit 7, an attached-object elimination monitoring unit 8, an attached-object region integration unit 9, a control signal outputting unit 10, and an attached-object elimination management unit 12. The vehicle 1 includes a lens cleaning unit 27 that cleans a lens of the camera 2. The lens cleaning unit 27 includes a wiper 271 that rubs off (wipe) an attached object on a lens, and a washer 272 that sprays a cleaning solution to the lens and washes off the attached object on the lens. The lens cleaning unit 27 is operated on the basis of a cleaning operation command from the lens cleaning control unit 26 (described later).

Different points between the control block diagram illustrated in FIG. 15 and the control block diagram in the second embodiment are the following five points. That is, these are a point that the vehicle 1 includes the lens cleaning unit 27, a point that an image recognition unit 20 and an image recognition region storage unit 21 are omitted, a point that the in-vehicle device 4 includes the lens cleaning control unit 26, a point that an output from the lens cleaning control unit 26 is input into the attached-object elimination management unit 12, and a point that an output from the control signal outputting unit 10 is input into the lens cleaning control unit 26. Note that a line that connects a vehicle monitoring unit 3 and an attached-object detection control unit 11 is omitted in FIG. 15. However, similarly to the second embodiment, an output from the vehicle monitoring unit 3 is input into the attached-object detection control unit 11. Also, a point that the attached-object detection control unit 11 includes a state switching table 17 is similar to the second embodiment. In the following, these different points will be described.

On the basis of an integrated attached-object region input from the attached-object region integration unit 9, the control signal outputting unit 10 determines whether a photographed image from the camera 2 fits to the above-described image utilization program. When determining that the photographed image does not fit to the image utilization program, the control signal outputting unit 10 outputs a control operation command to the lens cleaning control unit 26.

The determination by the control signal outputting unit 10 whether a photographed image fits to the image utilization program is performed, for example, on the basis of a rate of an area of an integrated attached-object region in the photographed image or a position of the integrated attached-object region in the photographed image. The control operation command output from the control signal outputting unit 10 to the lens cleaning control unit 26 may be a control operation command that constantly makes both of the wiper 271 and the washer 272 operated, or a control operation command that makes only one of the wiper 271 and the washer 272 operated on the basis of the integrated attached-object region.

Also, the control signal outputting unit 10 may switch an activated function of the lens cleaning unit 27 according to a kind of an attached object on the lens of the camera 2. For example, in a case of determining that a water drop is attached, the control signal outputting unit 10 outputs a control operation command of operating the wiper 271. Also, in a case of determining that mud is attached, the control signal outputting unit 10 outputs a control operation command of activating, in addition to the wiper 271, the washer 272 to make mud come off.

When receiving a control operation command from the control signal outputting unit 10, the lens cleaning control unit 26 outputs a cleaning operation command to the lens cleaning unit 27 and outputs cleaned region information to the attached-object elimination management unit 12. The cleaned region information is information indicating a region on a photographed image in which region an attached object is removed when the lens cleaning unit 27 cleans the lens of the camera 2 (cleaned region, in the following). For example, a region where the wiper 271 rubs off an attached object becomes a cleaned region in a case where the wiper 271 is operated, and a whole region of a photographed image becomes a cleaned region in a case where the washer 272 is operated.

Figure 16:
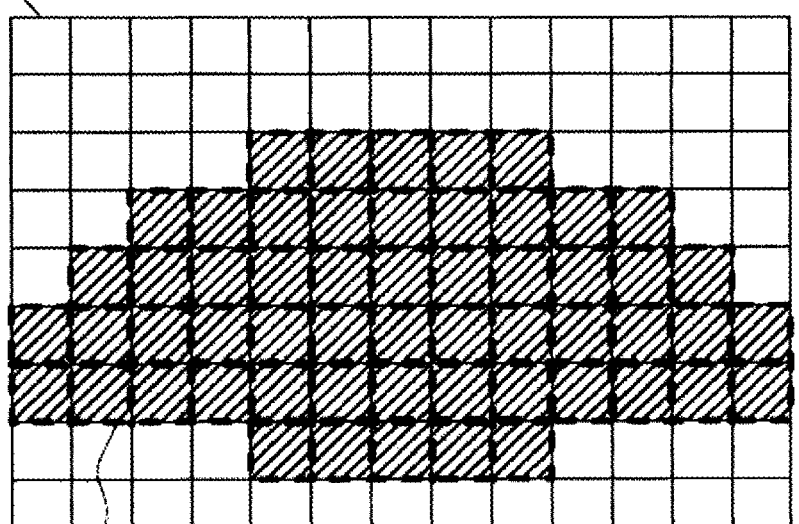
FIG. 16 is a view illustrating an example of a cleaned region of a case where a wiper is operated.

FIG. 16 is a view illustrating an example of a cleaned region of a case where the wiper 271 is operated. A cleaned region 28 is a region where the wiper 271 is operated on a detection surface 133 that is a photographed image divided in a grid manner. Referring back to FIG. 15, a description of the lens cleaning control unit 26 is continued.

Cleaned region information is previously stored in the lens cleaning control unit 26. A cleaning operation command and cleaned region information that are output from the lens cleaning control unit 26 correspond to a received control operation command. For example, when a control operation command of operating only the wiper 271 is received, a cleaning operation command of operating only the wiper 271 and cleaned region information of a case where only the wiper 271 is activated are output.

With reference to an operation situation of the vehicle 1 which situation is input from the vehicle monitoring unit 3 and an elimination relation table 22, the attached-object elimination management unit 12 rewrites a water drop region and a mud region of the attached-object region storage unit 7 on the basis of attached-object elimination region information input from the attached-object elimination monitoring unit 8 and cleaned region information input from the lens cleaning control unit 26. That is, in the present embodiment, the attached-object elimination region information and the cleaned region information are dirt removal information.

In the elimination relation table 22 referred to by the attached-object elimination management unit 12, an elimination region reflected object 224 is described for each function of the lens cleaning unit 27 controlled by the lens cleaning control unit 26. For example, with the wiper 271, it is possible to wipe off a water drop but it is difficult to remove mud when the lens is not wet. Thus, the elimination region reflected object 224 of the wiper 271 in the elimination relation table 22 is only water drop detection in principle. Also, since the washer 272 can wash off a water drop and mud, the elimination region reflected object 224 of the washer 272 is water drop detection and mud detection.

Also, the lens cleaning control unit 26 preferably switches an activated function of the lens cleaning unit 27 according to a kind of an attached object on the lens of the camera 2. For example, the wiper 271 is activated in a case where a water drop is attached and the washer 272 and the wiper 271 are activated in a case where mud is attached. In this case, on the basis of an integrated attached-object region input from the attached-object region integration unit 9, the control signal outputting unit 10 inputs a degree and a kind of an attached object on the lens of the camera 2 into the lens cleaning control unit 26.

According to the above-described fourth embodiment, the following effect can be acquired in addition to the effects of (1) to (5) in the first embodiment and the effects of (1), (2), and (4) in the second embodiment.

(1) An in-vehicle device 4 includes a lens cleaning control unit 26 that generates, on the basis of a cleaning operation of the lens cleaning unit 27, dirt removal information in which an object region of the cleaning operation is a region where dirt is removed.

Thus, the in-vehicle device 4 can output an operation command to the lens cleaning unit 27 and generate dirt removal information in which a region cleaned by the wiper 271 and/or washer 272 operated by the operation command is a region where dirt is removed.

The fourth embodiment described above can be modified and executed in the following manner.

First Modification Example of Fourth Embodiment

Since a lens cleaning control unit 26 cannot check whether an attached object is actually removed, there is a possibility that there is an attached object remaining in an attached-object cleaned region even when a lens cleaning unit 27 is operated. Thus, the lens cleaning control unit 26 may not input an attached-object cleaned region into an attached-object elimination management unit 12. Instead, the lens cleaning control unit 26 shortens an execution interval of an attached-object elimination monitoring unit 8, that is, increases a speed of processing before and after activation of the lens cleaning unit 27, whereby removal of an attached object by an operation of the lens cleaning unit 27 is securely detected. Alternatively, by operating the attached-object elimination monitoring unit 8 only when the lens cleaning unit 27 is operated, the lens cleaning control unit 26 may reduce a load on an arithmetic processing unit 41 due to processing by the attached-object elimination monitoring unit 8. However, in a case where the attached-object elimination monitoring unit 8 is operated only when the lens cleaning unit 27 is operated, removal of an attached object which removal is not due to an operation by the lens cleaning unit 27 is not detected. Thus, application is preferably performed in a situation in which an attached object on the lens of the camera 2 is not naturally removed.

Second Modification Example of Fourth Embodiment

In the first modification example of the fourth embodiment, a lens cleaning control unit 26 may include a table where which of monitoring units of an attached-object elimination monitoring unit 8 is operated or a speed of an operation of which is increased is determined according to an operated function of a lens cleaning unit 27. In this table, a water drop elimination monitoring unit 81 corresponds to an operation of a wiper 271 and the water drop elimination monitoring unit 81 and a mud elimination monitoring unit 82 correspond to an operation of a washer 272. For example, since a water drop is removed in a case where the wiper 271 is operated, the water drop elimination monitoring unit 81 is operated or a speed of an operation of the water drop elimination monitoring unit 81 is increased.

Third Modification Example of Fourth Embodiment

A vehicle 1 further includes a manual switch (not illustrated) and a control operation command may be output to a lens cleaning control unit 26 on the basis of operation on the manual switch by a passenger.

The first to fourth embodiments described above can be modified and executed in the following manner.

First Modification Example

An attached-object detection unit 6 includes a water drop detection unit 61 and a mud detection unit 62, and may further include a detection unit that detects a different kind of dirt such as a white turbidity detection unit. Also, it is only necessary to include at least two dirt detection units such as a water drop detection unit 61 and a white turbidity detection unit in the first embodiment, and it is only necessary to include at least one dirt detection unit in each of the second to fourth embodiments.

For example, a white turbidity detection unit detects white turbidity, which is one kind of dirt, in the following manner.

Figure 17:
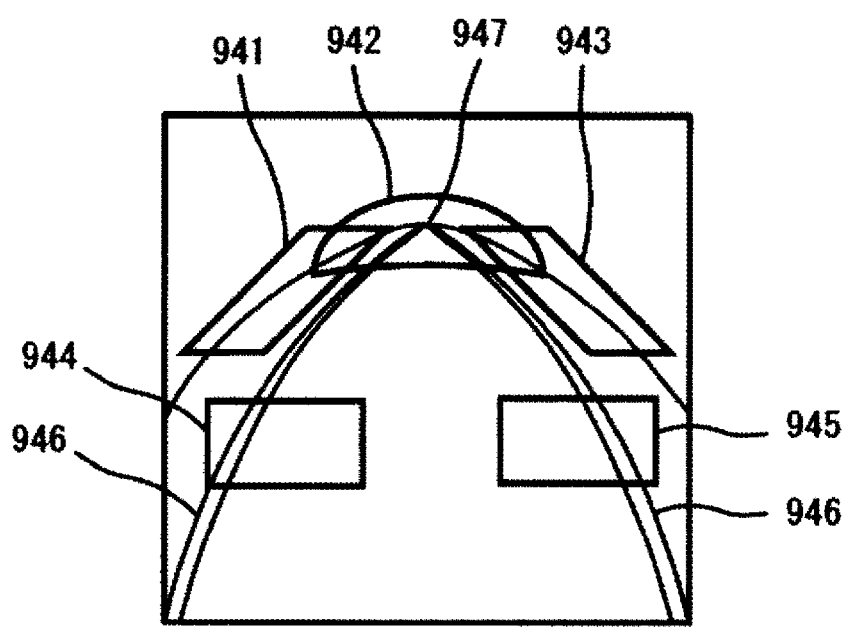
FIG. 17 is a view for describing white turbidity detection.

An operation of the white turbidity detection unit will be described with reference to FIG. 17. As illustrated in FIG. 17, the white turbidity detection unit sets an upper left detection region 941, an upper detection region 942, and an upper right detection region 943 in a position where a horizon is to appear on a photographed image. The upper detection region 942 is set in a position including a vanishing point of two lane markers provided in parallel on a road surface. In FIG. 17, a vanishing point 947 of two lane markers 946 is included on an inner side of the upper detection region 942. The upper left detection region 941 is set on a left side of the upper detection region 942 and the upper right detection region 943 is set on a right side of the upper detection region 942. Also, the white turbidity detection unit sets a lower left detection region 944 and a lower right detection region 945 in a position where a lane marker is to appear on a photographed image.

The white turbidity detection unit performs edge detection processing in a horizontal direction with respect to a pixel in each of the upper left detection region 941, the upper detection region 942, the upper right detection region 943, the lower left detection region 944, and the lower right detection region 945. In edge detection with respect to the upper left detection region 941, the upper detection region 942, and the upper right detection region 943, an edge such as a horizon is detected. Also, in edge detection with respect to the lower left detection region 944 and the lower right detection region 945, an edge such as the lane markers 946 is detected. The white turbidity detection unit calculates edge strength in each pixel included in each of the detection regions 941 to 945. Then, the white turbidity detection unit calculates an average value AE2 of edge strength in each of the detection regions 941 to 945 and determines whether the average value AE2 is smaller than a predetermined threshold s. The white turbidity detection unit determines that there is white turbidity in a detection region in which the average value AE2 of the edge strength is smaller than the threshold s.

Moreover, the white turbidity detection unit can calculate certainty, that is, accuracy of white turbidity in the following manner.

The white turbidity detection unit calculates the number of detection regions in which the average value AE2 of the edge strength is smaller than the threshold ε, that is, the number N2 of detection regions determined to have white turbidity among the detection regions 941 to 945. Subsequently, the white turbidity detection unit calculates time t2 in which it is continuously determined that each of the detection regions 941 to 945 has white turbidity. Then, the white turbidity detection unit calculates average duration t3 by dividing the sum of the time t2 of the detection regions 941 to 945 by the number of detection regions, that is, five. The white turbidity detection unit converts this average duration t3 into accuracy R2 of a detection result of the white turbidity detection unit. For example, the white turbidity detection unit previously sets a certain predetermined period TTHR3 and calculates R2=t3/TTHR3. The accuracy R2 indicates that accuracy is high and there is white turbidity as the average duration t3 of the white turbidity becomes longer. Also, since t3 itself is average white turbidity duration of the five detection regions 941 to 945, accuracy of white turbidity is increased as duration of all of the five detection regions 941 to 945 becomes long. The accuracy R2 is expressed by a numeric value from 0 to 1, and is expressed as 1 and becomes a value indicating a state in which accuracy is high and there is white turbidity in a case where TTHR3<t3.

Second Modification Example

A water drop detection unit 61 may detect a water drop in the following manner.

An operation of the water drop detection unit 61 will be described with reference to FIGS. 18(*a*) and (*b*). As illustrated in FIG. 18(*a*), the water drop detection unit 61 divides an image region of a photographed image 930 into a plurality of blocks B (x, y). Each block B (x, y) includes a plurality of pixels of the photographed image.

The water drop detection unit 61 calculates a score S1 (x, y) indicating attachment time of a water drop with respect to each block B (x, y). An initial value of the score S1 (x, y) is zero and a predetermined value is added thereto each time it is determined that a water drop is attached to the block B (x, y) by determination described in the following.

Score calculation for each pixel by the water drop detection unit 61 is in the following manner. FIG. 18(*b*) is a view in which an arbitrary pixel 931 is a focus point. The water drop detection unit 61 sets, as an inner reference point 932, a pixel that is away from the focus point 931 for a predetermined distance such as three pixels in each of an upper direction, an upper right direction, a lower right direction, an upper left direction, and a lower left direction and sets, as an outer reference point 933, a pixel that is further away for a predetermined distance such as three pixels in each of the five directions. Next, the water drop detection unit 61 calculates luminance for each of the inner reference point 932 and the outer reference point 933.

A center part of a water drop is likely to be blighter than an edge part due to a lens effect. Thus, the water drop detection unit 61 determines, with respect to each of the five directions, whether luminance of the inner reference point 932 is higher than luminance of the outer reference point 933. In other words, the water drop detection unit 61 determines whether the focus point 931 is a center part of a water drop. In a case where luminance of the inner reference point 932 in each direction is higher than luminance of the outer reference point 933 in the same direction, the water drop detection unit 61 increases a score S1 (x, y) of B (x, y), to which the focus point 931 belongs, for a predetermined value such as 1.

The water drop detection unit 61 determines that a block, in which the score S1 (x, y) is equal to or larger than a predetermined value, as a region where a water drop is detected. The water drop detection unit 61 can further calculate accuracy of water drop detection in the following manner.

After performing the above-described determination with respect to all pixels in the photographed image, the water drop detection unit 61 calculates elapsed time t1 after initialization of the score S1 (x, y) of each block B (x, y). Then, the water drop detection unit 61 divides the score S1 (x, y) of each block B (x, y) by the elapsed time t1 and calculates a time average S1 (x, y)/t1 of the score S1 (x, y). The water drop detection unit 61 calculates a score average AS1 by calculating the sum of the time average S1 (x, y)/t1 of all blocks B (x, y) and dividing this by the number of all blocks in the photographed image 930.

When a water drop is continuously attached to a lens, the score average AS1 is increased in each frame. In other words, in a case where the score average AS1 is large, a probability that a water drop is attached to the lens for a long time is high. The water drop detection unit 61 generates accuracy R1 of a detection result of the water drop detection unit 61 by using this score average AS1. In a case of a water drop, there is a vertical variation of the score S1 (x, y) due to an influence of falling off of water on the lens, or the like in a traveling situation in which rain is likely to be attached. Thus, the score average AS1 is used as a current attachment amount of a water drop on the lens. With respect to the accuracy R1, unlike a case of mud or white turbidity, a lens state changes greatly and there is a case where the score S1 (x, y) is temporarily decreased even when it is rainy in a case of a water drop. Thus, a count CS1 of time in which the score average AS1 exceeds a certain constant value TAS1. The water drop detection unit 61 holds the count CS1 of time even when the score average AS1 becomes lower than the constant value TAS1 for a certain predetermined period and decreases the score S1 (x, y) in a case where the score average AS1 becomes lower for the predetermined period or longer. The water drop detection unit 61 determines a threshold AS1THR and calculates accuracy R1=CS1/AS1THR. The water drop detection unit 61 expresses the accuracy R1 by 1 in a case where the count CS1 of time exceeds AS1THR. As the accuracy R1 becomes closer to 1, attachment of a detected water drop becomes more reliable.

Third Modification Example

A mud detection unit 62 may detect mud in the following manner.

As illustrated in FIG. 18(*a*) described above, the mud detection unit 62 divides an image region of a photographed image 930 into a plurality of blocks B (x, y). The mud detection unit 62 calculates, for each block B (x, y), a value of a score S4 (x, y) in the following manner, an initial value thereof being zero.

Next, the mud detection unit 62 detects luminance of each pixel of the photographed image 930. Then, the mud detection unit 62 calculates, for each block B (x, y), the sum $I_t$ (x, y) of the luminance of the pixels included in the block B (x, y). The mud detection unit 62 calculates, for each block B (x, y), a difference $\Delta I$ (x, y) between $I_t$ (x, y) calculated for a photographed image in a current frame and $I_{t-1}$ (x, y) calculated similarly for a photographed image in a previous frame.

The mud detection unit 62 detects a block B (x, y) in which $\Delta I$ (x, y) is small and $I_t$ (x, y) is small compared to a surrounding block and increases a score S4 (x, y) corresponding to the block B (x, y) for a predetermined value such as 1.

The mud detection unit 62 determines that a block in which the score S4 (x, y) is equal to or larger than a predetermined value is a region where mud is detected. The mud detection unit 62 can further calculate accuracy of mud detection in the following manner.

After performing the above-described determination with respect to all pixels in a photographed image, the mud detection unit 62 acquires a score integration value of the score S4 (x, y) in each block B (x, y) in a certain predetermined period t5. Then, the mud detection unit 62 calculates a time average S4 (x, y)/t5 of the score S4 (x, y) by dividing the score S4 (x, y) in each block B (x, y) by the predetermined period t5. The mud detection unit 62 calculates a score average $AR_{S4}$ by calculating the sum of the time average S4 (x, y)/t5 of all blocks B (x, y) and dividing this by the number of all blocks in the photographed image 930. Meaning of the score average $AR_{S4}$ is close to an amount of mud attached to the lens in a certain predetermined period. Thus, the mud detection unit 62 calculates an average value of $\Delta I$ (x, y) in the predetermined period t5 and a predicted value of a luminance change amount on a screen which value is predicted from a surrounding light source environment, calculates a predicted value of an average value/luminance change amount in the predetermined period t5 of $A_{S4}=\Delta I$ (x, y), and sets this as transmittance.

When mud is continuously attached to the lens, the score average $AR_{S4}$ is increased in each frame imaged serially. In other words, in a case where the score average $AR_{S4}$ is large, a probability that a lot of mud is attached to the lens is high. Also, time in which the score $A_{S4}$ becomes larger than a threshold $TA_{S4}$ is used as accuracy. The mud detection unit 62 determines a threshold AS4THR and calculates accuracy R4=$TA_{S4}$/AS4THR. The mud detection unit 62 expresses the accuracy R4 by 1 in a case where $TA_{S4}$ exceeds AS4THR. As the accuracy R4 becomes closer to 1, attachment of detected mud becomes more reliable.

Fourth Modification Example

A vehicle 1 may further include a vehicle control unit that controls traveling of a vehicle. For example, a vehicle operation unit has a function of controlling an accelerator, a brake, or an angle of a steering wheel of a vehicle, and the like. Then, a control signal outputting unit 10 generates a control signal on the basis of an integrated attached-object region input from an attached-object region integration unit 9 and inputs this into the vehicle operation unit. For example, in a case where the integrated attached-object region is larger than an area corresponding to a predetermined rate in a photographed image, it is determined that performance in recognition of a surrounding environment by utilization of a photographed image from a camera 2 is low, and an accelerator or a brake is controlled in such a manner that a vehicle speed becomes equal to a lower than a certain speed or a vehicle is stopped.

Fifth Modification Example

An in-vehicle device 4 may include an object recognition unit that performs image processing of detecting an object such as a lane marker or a pedestrian by using a photographed image from a camera 2, and a control signal outputting unit 10 may perform additional processing described in the following.

Since an attached-object region in which an attached object on a lens of the camera 2 appears in a photographed image hides an object, object detection cannot be performed correctly in the attached-object region. Thus, the control signal outputting unit 10 generates, as a mask image, an integrated attached-object region input from an attached-object region integration unit 9 and inputs this into the object recognition unit. The object recognition unit excludes the integrated attached-object region indicated by the input mask image from a photographed image from the camera 2 and performs image processing to detect an object such as a lane marker or a pedestrian.

Alternatively, in a case of determining that a photographed image from the camera 2 does not satisfy enough quality for the image processing by the object recognition unit on the basis of the integrated attached-object region input from the attached-object region integration unit 9, the control signal outputting unit 10 outputs a fail signal to the object recognition unit. For example, in a case where a size of the integrated attached-object region exceeds a threshold, the control signal outputting unit 10 outputs a fail signal. The object recognition unit suspends the image processing while the fail signal is received. Also, the control signal outputting unit 10 may tell an annunciation unit 5 that the image processing by the object recognition unit is suspended.

Sixth Modification Example

When eliminating a region, which is indicated by dirt removal information, from attached-object region information stored in an attached-object region storage unit 7, an attached-object elimination management unit 12 may rewrite the attached-object region information in such a manner that a whole attached-object region is deleted in a case where the following condition is satisfied. That is a case where a region indicated by the dirt removal information has an area equal to or larger than a predetermined rate of the attached-object region such as a case where a region indicated by the dirt removal information is equal to or larger than 80% of the attached-object region.

The following effect can be acquired according to the present modification example.

(1) When a relationship between dirt removal information and dirt region information satisfies a predetermined condition, a rewriting unit, that is, an attached-object elimination management unit 12 assumes that all dirt on a lens is removed and rewrites attached-object region information in such a manner that a whole attached-object region is deleted. Thus, it is possible to prevent a situation in which attached-object regions are sparsely scattered.

Seventh Modification Example

An attached object on a lens of a camera 2 is an object in any of the above-described embodiments. However, in a case where a camera 2 is provided inside a vehicle, an attached object on a window in front of the camera 2 may be an object. In this case, a lens cleaning unit 27 is a device that removes an attached object on the front window.

Eighth Modification Example

In each of the second to fourth embodiments, an attached-object detection control unit 11 may not be included. In that case, a water drop detection unit 61 and a mud detection unit 62 are operated constantly. According to the present eighth modification example, there is an advantage that an attached-object elimination management unit 12 can rewrite water drop region information or mud region information and promptly update an integrated attached-object region even when the water drop detection unit 61 and the mud detection unit 62 are operated.

Ninth Modification Example

An in-vehicle device 4 may output, as attached-object elimination region information, information of a region where no attached object is detected by a water drop detection unit 61 or a mud detection unit 62 to an attached-object elimination management unit 12 More specifically, a region where no attached object is detected by the water drop detection unit 61 and a region where no attached object is detected by the mud detection unit 62, that is, regions that are not stored into storage units of an attached-object region storage unit 7 are input as attached-object elimination regions into the attached-object elimination management unit 12.

Tenth Modification Example

In a case of determining that a vehicle 1 is in a parking lot from positional information acquired from a GPS receiver (not illustrated) or map information (not illustrated), a vehicle speed monitoring unit 32 of a vehicle monitoring unit 3 may output that a vehicle speed is almost zero. In this case, when the vehicle 1 enters a parking lot, it is output to an attached-object detection control unit 11 that a vehicle speed is almost zero, and an operation of a mud detection unit 62 is stopped according to a description in a state switching table 17.

The above-described embodiments and modification examples of the present invention are just examples and the present invention is not limited to contents thereof as long as a characteristic of the invention is not damaged. Also, the above-described embodiments and modification examples may be combined and executed as long as a characteristic of the invention is not damaged. For example, a function of an image recognition unit 20 or an image recognition region storage unit 21 included in the second embodiment can be embedded in an in-vehicle device 4 in the first embodiment.

A program is assumed to be stored in a ROM (not illustrated). However, an in-vehicle device 4 may include an input/output interface (not illustrated) and a program may be read from a different device through the input/output interface and a medium that can be used by the in-vehicle device 4. Here, for example, the medium indicates a storage medium that can be attached to/detached from the input/output interface, a communication medium, that is, a wired, wireless, or optical network, or a carrier wave or a digital signal propagated in the network. Also, a part or all of a function realized by a program may be realized by a hardware circuit or FPGA.

REFERENCE SIGNS LIST 1 vehicle
2 camera
4 in-vehicle device
6 attached-object detection unit
61 water drop detection unit
62 mud detection unit
7 attached-object region storage unit
71 water drop region storage unit
72 mud region storage unit
8 attached-object elimination monitoring unit
81 water drop elimination monitoring unit
82 mud elimination monitoring unit
11 attached-object detection control unit
12 attached-object elimination management unit
17 state switching table
20 image recognition unit
201 pedestrian detection unit
202 vehicle detection unit
22 elimination relation table
23 attached-object elimination detection unit
26 lens cleaning control unit
41 arithmetic processing unit
42 image acquisition unit

The invention claimed is:
1. An in-vehicle device comprising:
   an image acquisition unit that acquires an image photographed by a camera including a lens;
   a storage unit;
   a dirt detection unit that detects dirt on the lens on the basis of the image acquired by the image acquisition unit and that stores dirt region information indicating a region where the dirt exists in the image into a storage unit;

a dirt removal information generation unit that generates dirt removal information indicating a region where the dirt on the lens is removed; and a rewriting unit that rewrites the dirt region information on the basis of the dirt removal information, wherein the dirt detection unit includes a first dirt detection unit and a second dirt detection unit that detect different kinds of dirt, the first dirt detection unit stores the detected dirt as first dirt region information into the storage unit, and the second dirt detection unit stores the detected dirt as second dirt region information into the storage unit, further comprising a first monitoring unit that generates first dirt removal information on the basis of the first dirt region information, a second monitoring unit that generates second dirt removal information on the basis of the second dirt region information, and a table storage unit that stores an elimination relation table in which a condition for rewriting the first dirt region information and a condition for rewriting the second dirt region information are stored, wherein the rewriting unit rewrites the second dirt region information on the basis of the condition described in the elimination relation table and the first dirt removal information, and rewrites the first dirt region information on the basis of the condition described in the elimination relation table and the second dirt removal information.

2. The in-vehicle device according to claim 1,
wherein the dirt detection unit and the dirt removal information generation unit use different algorithms.

3. The in-vehicle device according to claim 1,
wherein the dirt removal information generation unit generates the dirt removal information on the basis of a detection result of a different kind of dirt detection unit that detects dirt of a kind different from that of dirt that can be detected by the dirt detection unit.

4. The in-vehicle device according to claim 3,
wherein the dirt detection unit detects mud and the different kind of dirt detection unit detects a water drop.

5. The in-vehicle device according to claim 1,
wherein the condition for rewriting the first dirt region information and the condition for rewriting the second dirt region information which conditions are described in the elimination relation table at least include a speed of a vehicle including the camera.

6. The in-vehicle device according to claim 1,
further comprising a lens cleaning control unit that generates, on the basis of a cleaning operation on the lens, the dirt removal information with an object range of the cleaning operation as a region where the dirt is removed.

7. The in-vehicle device according to claim 1,
further comprising a non attached-object detection unit that detects a region with no attached object from the image and that generates the dirt removal information on the basis of the detected region.

8. The in-vehicle device according to claim 1,
further comprising an object recognition unit that recognizes an object from the image and that generates dirt removal information in which a region where the object is recognized is a region where the dirt on the lens is removed.

9. The in-vehicle device according to claim 1,
further comprising an instantaneous change detection unit that detects, from the image, a no-change region with no change for a long time and an instantaneous change region in which a luminance difference is larger than a predetermined value in successively acquired images and that generates dirt removal information in which a region, which is included in the no-change region, in the instantaneous change region is a region where the dirt on the lens is removed.

10. The in-vehicle device according to claim 1,
wherein the rewriting unit rewrites the dirt region information on the basis of the dirt removal information in a case where the dirt detection unit is not operated.

11. The in-vehicle device according to claim 10,
further comprising a state switching table indicating correspondence between an operation state of a vehicle including the camera and existence/non-existence of an operation of the dirt detection unit, and an operation switching unit that operates or stops the dirt detection unit on the basis of an operation state of the vehicle and the state switching table, wherein the rewriting unit determines whether there is an operation of the dirt detection unit on the basis of the operation state of the vehicle and the state switching table.

12. The in-vehicle device according to claim 1,
further comprising a table storage unit that stores an elimination relation table indicating a condition for the rewriting unit to be operated, wherein the elimination relation table at least includes an operation situation of a vehicle including the camera, and the rewriting unit is operated on the basis of an operation situation of the vehicle, and the elimination relation table.

13. The in-vehicle device according to claim 1,
wherein the rewriting unit assumes that all dirt on the lens is removed, and rewrites the dirt region information when a relationship between the dirt removal information and the dirt region information satisfies a predetermined condition.

14. The in-vehicle device according to claim 1,
wherein accuracy information indicating certainty of removal of dirt is added for each region in the dirt removal information, and the rewriting unit rewrites the dirt region information on the basis of the accuracy information.

* * * * *